(12) United States Patent
Sato et al.

(10) Patent No.: US 7,372,821 B2
(45) Date of Patent: May 13, 2008

(54) SIGNAL PROCESSING SYSTEM, SIGNAL RECEIVING DEVICE, AND COMMUNICATION CONTROL METHOD

(75) Inventors: Makoto Sato, Tokyo (JP); Junji Kato, Tokyo (JP); Michio Miyano, Kanagawa (JP); Yuichi Kageyama, Tokyo (JP); Norifumi Kikkawa, Tokyo (JP)

(73) Assignee: Sony Corporation, Tokyo (JP)

( * ) Notice: Subject to any disclaimer, the term of this patent is extended or adjusted under 35 U.S.C. 154(b) by 960 days.

(21) Appl. No.: 10/479,675

(22) PCT Filed: Apr. 1, 2003

(86) PCT No.: PCT/JP03/04174

§ 371 (c)(1),
(2), (4) Date: Dec. 2, 2003

(87) PCT Pub. No.: WO03/084140

PCT Pub. Date: Oct. 9, 2003

(65) Prior Publication Data

US 2004/0174827 A1 Sep. 9, 2004

(30) Foreign Application Priority Data

Apr. 3, 2002 (JP) ............................. 2002-101454

(51) Int. Cl.
*H04N 7/00* (2006.01)
(52) U.S. Cl. .................... 370/257; 370/421; 725/141
(58) Field of Classification Search ............... 370/254, 370/257, 362, 421; 709/220, 221; 725/133, 725/135, 139, 141, 153; 710/104
See application file for complete search history.

(56) References Cited

U.S. PATENT DOCUMENTS

| | | | | |
|---|---|---|---|---|
| 5,919,261 A | * | 7/1999 | Aoki et al. | 713/300 |
| 6,108,718 A | * | 8/2000 | Fujimori et al. | 710/9 |
| 6,160,796 A | * | 12/2000 | Zou | 370/257 |
| 6,185,632 B1 | * | 2/2001 | Berkema | 710/20 |
| 6,785,720 B1 | * | 8/2004 | Seong | 709/220 |
| 6,823,399 B2 | * | 11/2004 | Horiguchi et al. | 710/6 |
| 6,885,631 B1 | * | 4/2005 | Kim et al. | 370/216 |

(Continued)

FOREIGN PATENT DOCUMENTS

| | | |
|---|---|---|
| EP | 1 209 857 | 5/2002 |
| JP | 11-346237 | 12/1999 |
| JP | 2001-77826 | 3/2001 |
| JP | 2001-230793 | 8/2001 |
| TW | 428396 | 4/2001 |
| WO | WO 01/03377 | 1/2001 |

*Primary Examiner*—Min Jung
(74) *Attorney, Agent, or Firm*—Finnegan, Henderson, Farabow, Garrett & Dunner, L.L.P.

(57) ABSTRACT

The present invention relates to a signal processing system, and proposes the switching operation of device selection which is naturally performed for a user. The signal input device 5 comprises a registration means for registering the signal output devices 3, 4, and an establishment means for, when an establishment request signal requesting the establishment of a signal path is sent from any signal output device 3, 4 out of a plurality of the signal output devices 3, 4, judging whether the signal output device 3, 4, which sent the establishment request signal, is registered in the signal input device 5, and establishing the signal path between the signal output device 3, 4 and the signal input device 5 depending on the judged result, thereby avoiding unnatural operation which is not performed in accordance with user operation, thus making it possible to perform the switching operation of device selection which is naturally performed for a user.

16 Claims, 38 Drawing Sheets

U.S. PATENT DOCUMENTS

| | | | |
|---|---|---|---|
| 7,150,032 B1* | 12/2006 | Sadanaka et al. | 725/80 |
| 2001/0007118 A1* | 7/2001 | Matsuda | 710/129 |
| 2001/0028645 A1 | 10/2001 | Horiguchi et al. | |
| 2003/0009597 A1* | 1/2003 | Joung | 709/249 |
| 2003/0091326 A1* | 5/2003 | Miyano et al. | 386/46 |
| 2005/0207438 A1* | 9/2005 | Horiguchi et al. | 370/421 |

* cited by examiner

SIGNAL PROCESSING SYSTEM, SIGNAL RECEIVING DEVICE, AND COMMUNICATION CONTROL METHOD

TECHNICAL FIELD

The present invention relates to a signal processing system, a signal input device and a communication control method, and is suitably applied to a network system for communicating data between various kinds of AV (Audio Visual) devices connected on a network.

BACKGROUND ART

Heretofore, there is an IEEE (Institute of Electrical Electronics Engineers) 1394 standard as bus standards for transferring multimedia data with high speed in real-time, and various kinds of AV devices which can mutually transmit data through a network using digital serial buses under the IEEE1394 standard have been developed.

In such network system, provided are an isochronous transfer mode for transmitting real-time data and an asynchronous transfer mode for transmitting control commands without fail.

In this network system, therefore, a logical connection (hereinafter, referred to as logical connection) should be established as a signal transfer path between a source and a sink to transmit real-time data, the source generating and outputting the real-time data, the sink receiving the real-time data outputted from the source.

On the other hand, in this network system, the AV devices connected to the network system can be controlled by transmitting AV/C (Audio/video control) command•transaction•set (A/V Command Transaction Set) (hereinafter, referred to as AV/C command) as a control command.

By the way, there exist various plugs for both ends of logical connections, and the plugs include a subunit•plug (Subunit Plug) for transmitting signals inside a device, a plug•control•register (Plug Control Register) (hereinafter, referred to as PCR) for inputting/outputting digital signals between devices, and an external•plug (External Plug) for inputting/outputting analog signals between devices.

As the subunit•plug, there exist a subunit•source•plug (Subunit Source Plug) for output and a subunit•destination•plug (Subunit Destination Plug) for input. As the PCR, there exist an oPCR (Output Plug Control Register) for output and an iPCR (Input Plug Control Register) for input. As the external•plug, there exist an external•output•plug (External Output Plug) for output and an external•input•plug (External Input Plug) for input. In this connection, plugs for output are referred to as output plugs and plugs for input are referred to as input plugs in the following description.

In addition, as a logical connection, there exist an internal device connection and an interdevice connection, and the internal device connection indicates a signal path existing inside a device and the interdevice connection indicates a signal path between a source and a sink.

Further, the interdevice connections have various forms. That is, the interdevice connections include a point•to•point (Point-to-Point) connection (hereinafter, referred to as PtoP connection) in which one oPCR and one iPCR are connected on one isochronous channel (hereinafter, referred to as channel).

In addition, the interdevice connections include a broadcast•out (Broadcast out) connection (hereinafter, referred to as Bout connection) in which one oPCR is connected to one channel, and a broadcast•in (Broadcast in) connection (hereinafter, referred to as Bin connection) in which one iPCR is connected to one channel, and these Bout connection and Bin connection are referred to as broadcast (Broadcast) connection.

In addition, the interdevice connections include an external•connection in which an external•output•plug and an external•input•plug are connected.

A procedure to establish and cancel such logical connection is standardized by IEC (International Electrotechnical Commission) 61883-1.

It should be noted that the establishment of one interdevice connection in a network system requires a channel and an isochronous band (hereinafter, referred to band), and the channel and band are referred to as isochronous resource (hereinafter, referred to as resource).

By the way, in such network system, a command set called AV/C connection•and•compatibility•management (AV/C Connection and Compatibility Management) (hereinafter, referred to as CCM) is provided to mutually communicate information for establishing a proper logical connection using a control command which is communicated between a source and a sink at the time of establishing a logical connection.

Now, explanation will be made on how to establish a signal path, which is a logical connection, using the CCM. The internal device connection can be established using a signal•source (SIGNAL SOURCE) command provided under the CCM, and the interdevice connection can be established using an input•select (INPUT SELECT) command provided under the CCM.

The input•select•command defines four sub•functions (sub functions): connect (CONNECT); path•change (PATH CHANGE); select (SELECT); and disconnect (DISCONNECT), and one of them should be specified when an input•select•command is sent. Now, a concrete explanation will be made on a case in which a sink accepts an input•select•command, that is, returns an accepted (ACCEPTED) response.

The sink establishes an interdevice connection with a designated source in the case of receiving CONNECT, and in the case of receiving PATH•CHANGE, it basically establishes an interdevice connection with a designated source, but it is able to reject the establishment of the interdevice connection, that is, to return a rejected (REJECTED) response if it does not select the designated source.

Further, when the sink receives SELECT, it selects a designated source and in this case, the sink can decide by itself whether to establish an interdevice connection. When the sink receives DISCONNECT, it disconnects a designated interdevice connection.

Under the CCM, a source communicates information on the source to a sink by transmitting an input•select•command, so that the sink establishes an interdevice connection with the source based on the information. In this case, in the network system, the sink which is a transmission target of the input•select•command should be recorded in the source in advance. In the CCM, an output•preset (OUTPUT PRESET) command is prepared for realizing such function. In addition, in the CCM, an input•select•command is used to record a source in a sink.

In such network system, based on the CCM, an internal device connection is established by a device itself and an interdevice connection is established by a sink. In this connection, the internal device connection can be controlled from the outside with a signal•source•command.

By the way, in the network system using the CCM, a source sends an input•select•command to a sink with information on an output plug of the source (hereinafter, referred to as output plug information) attached to the input•select•command. The sink establishes an interdevice connection based on the output plug information given in the received input•select•command.

In addition, in the network system, when the sink establishes an interdevice connection, the sink directly establishes the interdevice connection based on output plug information of default.

Furthermore, in the network system, when a controller which is an AV device other than sources and sinks establishes an interdevice connection, the controller sends an input•select•command to a sink with output plug information of default attached to the input•select•command. The sink establishes an interdevice connection based on the output plug information given in the received input•select•command.

By the way, in the network system adopting the CCM, an auto-play processing has been developed to establish an interdevice connection between a source and a sink depending on the change of the state of the source.

Specifically, the controller makes the source register the sink by transmitting an output•preset•command to the source. If a trigger, such as the change to a replay mode, occurs in the source thereafter, the source transmits an input•select•command to the sink. The sink receives the input•select•command, and establishes an interdevice connection based on the information stored in the input•select•command.

In addition, in the network system adopting the CCM, path information notification processing by a source has been developed as a technique to establish an interdevice connection without a controller.

Specifically, when an appropriate output plug of the source is changed, the source notifies each of all registered sinks of new output plug information by transmitting an input•select•command in which the subfunction•field indicates PATH•CHANGE, to all the sinks. Each sink receives the input•select•command and establishes an interdevice connection with an appropriate input plug based on the output plug information stored in the input•select•command.

By the way, in a conventional network adopting the CCM, the selection condition of AV devices may be changed automatically without user operation, which is unnatural and unpreferable operation for a user.

A concrete explanation will be made on such operation hereafter. It is assumed that a network system is constructed by connecting an STB (Set Top Box), VCR (Video Casette Recorder), and TV (Television) to an IEEE1394 serial bus, the TV operates as a controller and a sink, and the STB and VCR operate as sources.

The TV firstly operates to set the VCR for auto-play processing. That is, the TV, which operates as the controller, transmits an output•preset•command to the VCR serving as the source to register the TV as a sink in the VCR serving as the source.

When the VCR serving as the source starts playback operation in response to user operation thereafter, it transmits an input•select•command to the TV serving as the sink. The TV serving as the sink receives this input•select•command, and then establishes an interdevice connection with the VCR.

Sequentially, the TV operates as the controller to register the STB as a source to change images to be displayed on a display from images being outputted from the VCR to images to be outputted from the STB. Specifically, the TV which operates as the controller registers the STB as a source in own functional blocks operating as the sink. In this case, the interdevice connection between the VCR and TV is cancelled.

Next, the TV operating as the controller transmits an output•preset•command to the STB to register the TV as a sink in the STB serving as the source. If the STB serving as the source is now outputting AV data, it transmits an input•select•command to the TV serving as the sink. When the TV serving as the sink receives this input•select•command, it establishes an interdevice connection with the STB.

Now, it is assumed that such change of condition that an appropriate output plug is changed occurs in the VCR, like a case where AV data to be outputted is changed on a tape from digital signals to analog signals, for example. In this case, since the VCR serving as the source has registered the TV as a sink, it notifies the TV of the new output plug information by transmitting an input•select•command in which the subfunction•field is PATH•CHANGE.

When the TV serving as the sink receives this input•select•command, it is designed to establish an interdevice connection with the VCR based on the output plug information stored in the input•select•command. In this case, however, the TV changes images being displayed on the display from output images of the STB to output images of the VCR without user operation, which is unnatural operation unintended by a user.

DESCRIPTION OF THE INVENTION

The present invention is made in consideration of the above points, and intends to propose a signal processing system, signal input device and communication control method which prevent unnatural operation unintended by users.

In order to solve such problems, in this invention, in a signal processing system which is constructed by connecting a plurality of signal output devices, a signal input device and a control device to a prescribed network and in which a signal path is established between any signal output device out of the plurality of signal output devices and the signal input device in response to a request of the control device and data signals outputted from the signal output device are inputted into the signal input device though the signal path, the signal input device comprises a registration means for registering the signal output devices and an establishment means for, in response to an establishment request signal requesting the establishment of the signal path from any signal output device out of the plurality of signal output devices, judging whether the signal output device, which sent the establishment request signal, is registered in the signal input device and establishing the signal path between the signal output device and the signal input device depending on the judged result. As a result, unnatural operation, which is not performed by user operation, are prevented.

Further, in the present invention, in a communication control method in a signal processing system which is constructed by connecting a plurality of signal output devices, a signal input device and a control device to a prescribed network and in which a signal path is established between any signal output device out of the plurality of signal output devices and the signal input device in response to a request of the control device and data signals outputted from the signal output device are inputted into the signal input device, the signal input device comprises a registration step of registering the signal output devices, and an establishment step of, in response to an establishment request signal requesting the establishment of the signal path from any signal output device out of the plurality of signal output devices, judging whether the signal output device, which sent the establishment request signal, is registered in the signal input device, and establishing the signal path between the signal output device and the signal input device depending on the judged result, as a result, unnatural operation, which is not performed by user operation, can be prevented.

BEST MODE FOR CARRYING OUT THE INVENTION

Hereinafter, one embodiment of the present invention will be described in detail with reference to attached drawings.

(1) Construction of Network System

Figure 1:
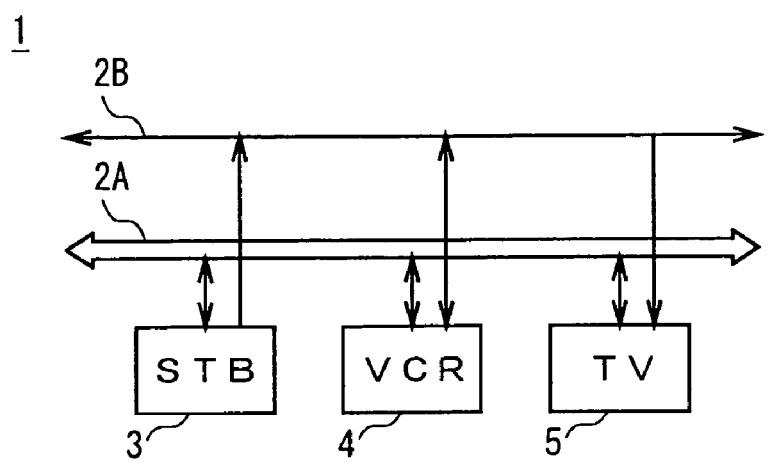
FIG. 1 is a block diagram showing one embodiment of a network system of this invention.

In FIG. 1, reference numeral 1 shows the construction of a network system, wherein a STB (Set Top Box) 3, a VCR (Video Casette Recorder) 4 and a TV (Television) 5 are connected to an IEEE1394 serial bus 2A and an analog cable 2B.

Figure 2:
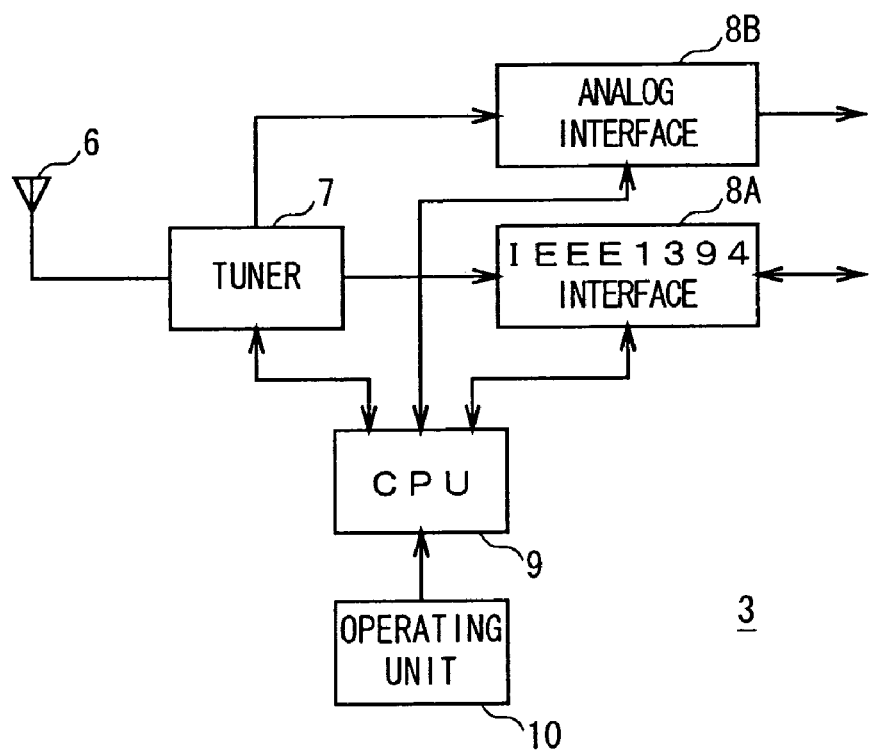
FIG. 2 is a block diagram showing the construction of an STB.

As shown in FIG. 2, the STB 3 inputs a reception signal received by an antenna 6, into a tuner 7 which then performs prescribed signal processing, and the obtained AV data is outputted to the outside via an IEEE1394 interface 8A or an analog interface 8B.

A CPU (Central Processing Unit) 9 controls the operation of circuits composing the STB 3 according to user inputs on an operating unit 10, and transmits to and receives from the VCR 4 and the TV 5 various commands via the IEEE1394 interface 8A in accordance with software stored in an internal memory.

Figure 3:
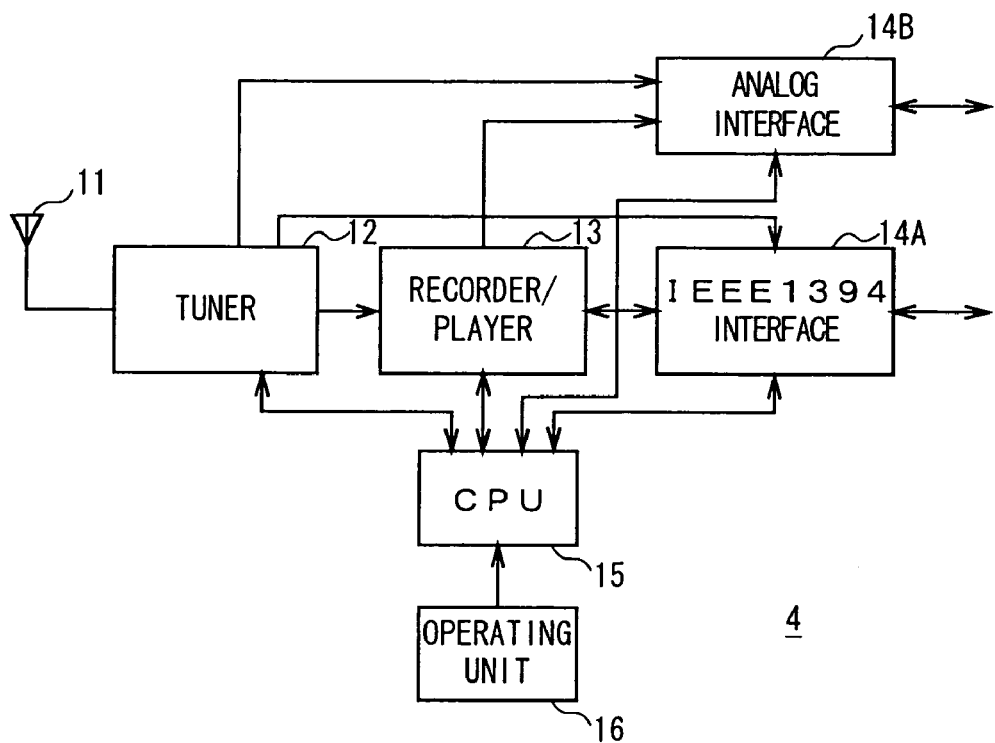
FIG. 3 is a block diagram showing the construction of a VCR.

As shown in FIG. 3, the VCR 4 inputs reception signal received by an antenna 11, into a tuner 12 which then performs prescribed signal processing and AV data obtained according to necessity is outputted to a recorder/player 13 to record it on a built-in recording medium or is outputted to the outside via an IEEE1394 interface 14A or an analog interface 14B. In addition, when the VCR 4 receives AV data from the outside via the IEEE1394 interface 14A or the analog interface 14B, the AV data is outputted to the recorder/player 13 to record therein.

The recorder/player 13 reproduces AV data recorded on the recording medium according to necessity, and outputs this to the outside via the IEEE1394 interface 14A or the analog interface 14B. In addition, the VCR 4 outputs AV data supplied from the outside, according to necessity, via the IEEE1394 interface 14A or the analog interface 14B to the outside as it is.

The CPU 15 controls the operation of circuits composing the VCR 4 according to user inputs on an operating unit 16, and in addition, transmits to and receives from the STB 3 and the TV 5 various commands via the IEEE1394 interface 14A in accordance with software stored in an internal memory.

Figure 4:
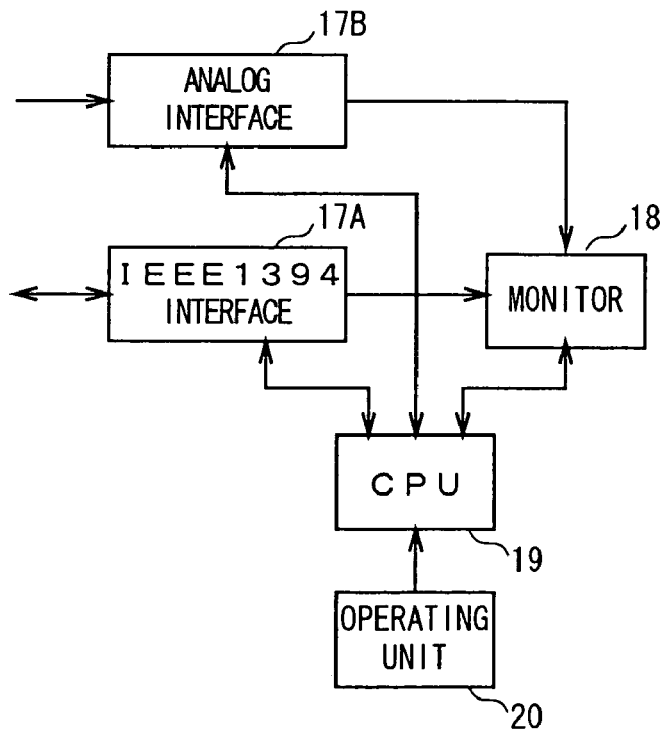
FIG. 4 is a block diagram showing the construction of a TV.

As shown in FIG. 4, the TV 5 outputs AV data received via the IEEE1394 interface 17A or analog interface 17B from the outside, to a monitor 18 to display thereon. A CPU 19 controls the operation of circuits composing the TV 5 in response to user inputs on an operating unit 20, and in addition, transmits to and receives from the STB 3 and the VCR 4 various commands via an IEEE1394 interface 17A in accordance with software stored in an internal memory.

Figure 5:
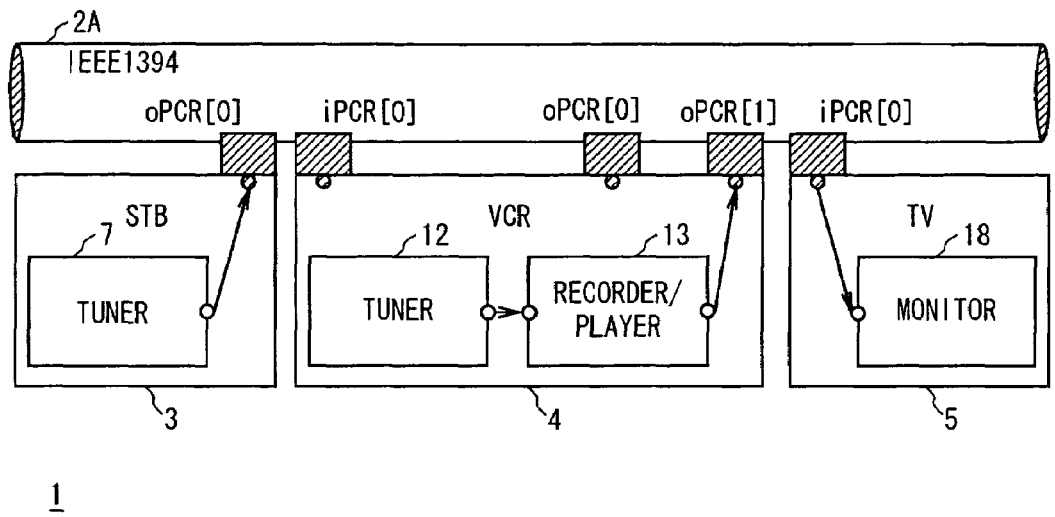
FIG. 5 is a schematic diagram explaining the network system.

Now, the functional construction of the network system 1 is shown in FIG. 5 where the same reference numerals are applied to parts corresponding to those of FIG. 1 to FIG. 4. In the network system 1, as shown in FIG. 5, as to PCR, the STB 3 is provided with oPCR[0] for output, the VCR 4 is provided with iPCR[0] for input and oPCR[0] and oPCR[1] for output, and the TV 5 is provided with iPCR[0] for input.

(2) Establishment of Interdevice Connection According to Signal Path Inside Source In this embodiment, the STB 3 operates as a controller and performs device selection processing to set a combination of sink and source, and thereby sets the VCR 4 as a source and the TV 5 as a sink.

Figure 6:
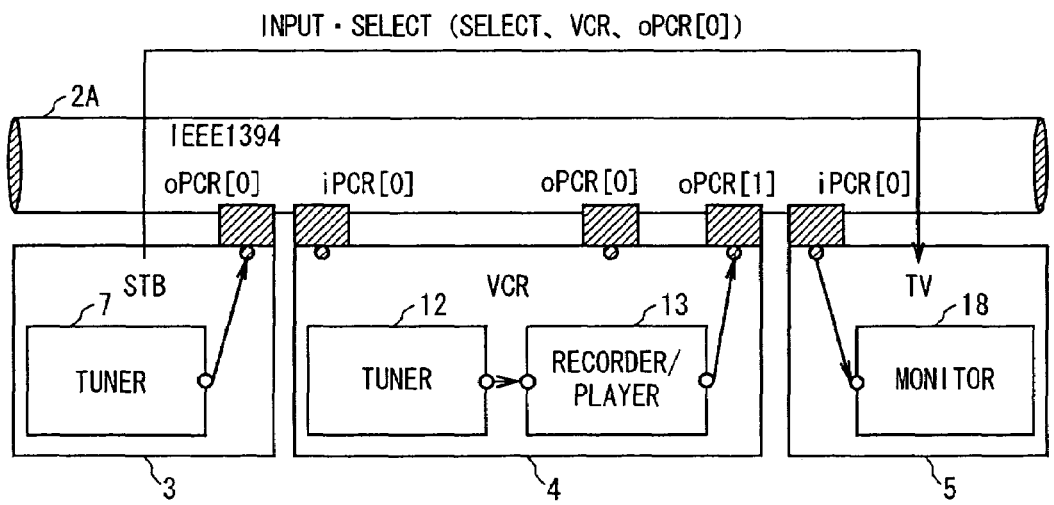
FIG. 6 is a schematic diagram explaining a case of registering the VCR as a source in the TV.

First, the STB 3 serving as the controller registers the VCR 4 as a source in the TV 5 as shown in FIG. 6. Specifically, the STB 3 serving as the controller sends an input•select•command to the TV 5. In this connection, the STB 3 serving as the controller specifies SELECT in the subfunction (subfunction) field of the input•select•command, specifies the node ID of the VCR 4 in the node ID (node_ID) field, and specifies an output plug number of default in the output•plug (output_plug) field. In this connection, the output plug number of default can be freely set by the STB 3 serving as the controller.

When the TV 5 receives this input•select•command, it registers the specified node ID, that is, the VCR 4 as a source.

Figure 7:
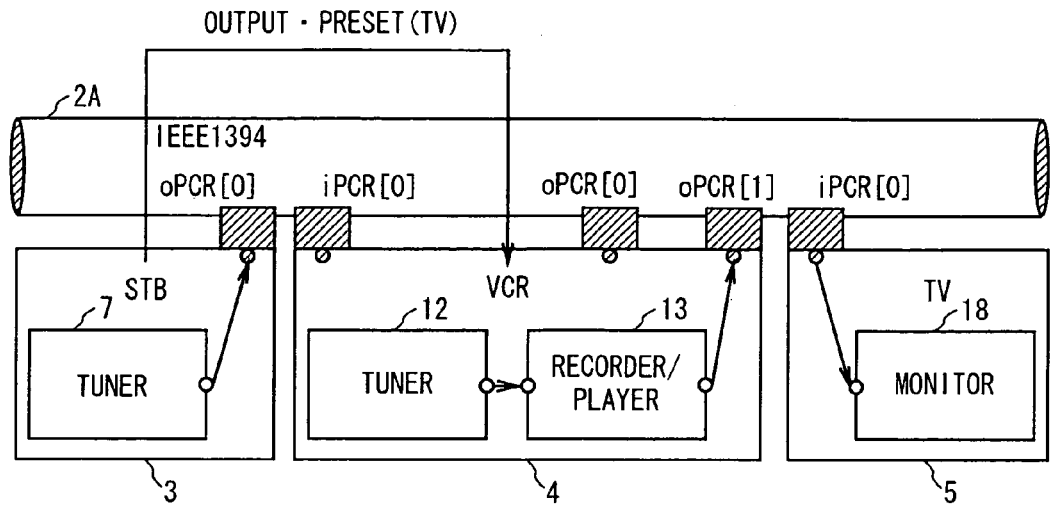
FIG. 7 is a schematic diagram explaining a case of registering the TV as a sink in the VCR.

Next, the STB 3 serving as the controller registers the TV 5 as a sink in the VCR 4 as shown in FIG. 7. Specifically, the STB 3 serving as the controller sends an output•preset•command to the VCR 4. In this case, the STB 3 serving as the controller specifies the node ID of the TV 5 in the destination•nodeID (destination_node_ID) field of the output•preset•command.

Figure 8:
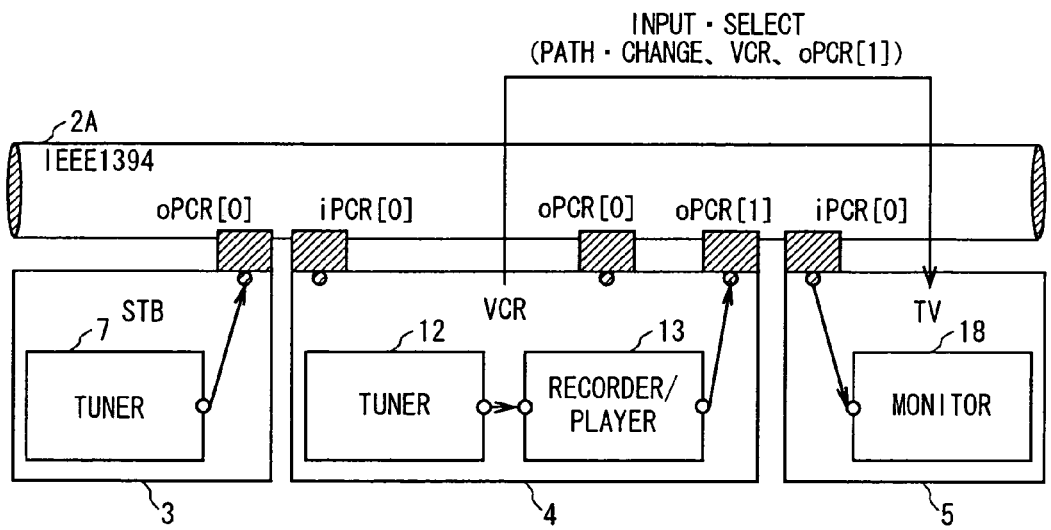
FIG. 8 is a schematic diagram explaining a case of registering an output plug in the TV.

When the VCR 4 serving as the source receives this output•preset•command, it sends an input•select•command to the TV 5 having the specified node ID as shown in FIG. 8. In this case, the VCR 4 serving as the source specifies PATH•CHANGE in the subfunction•field of the input•select•command, specifies the node ID of the VCR 4 itself in the nodeID•field, and specifies an appropriate output plug based on a signal path inside the VCR 4, in the output•plug•field.

Figure 9:
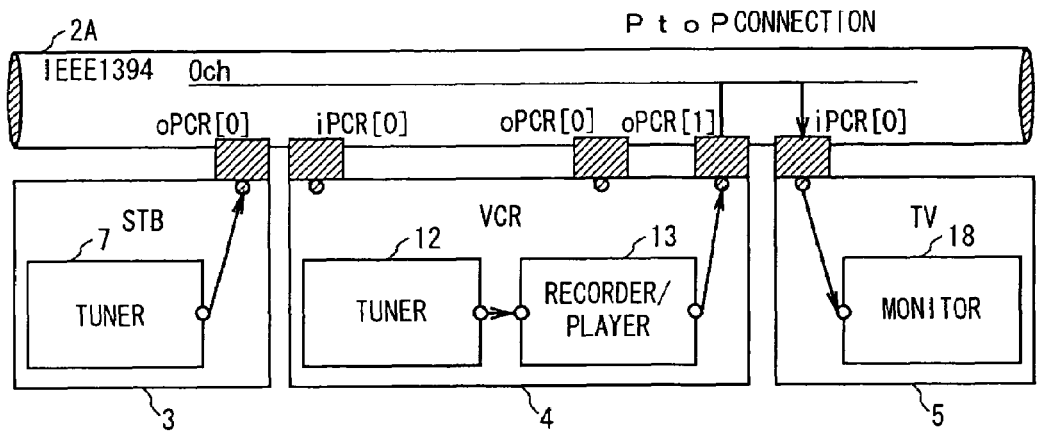
FIG. 9 is a schematic diagram explaining a case of establishing a PtoP connection.

Sequentially, when the TV 5 serving as the sink receives this input•select•command, it establishes an interdevice connection based on the output plug information attached to the input•select•command received, as shown in FIG. 9.

Specifically, the TV 5 serving as the sink establishes a PtoP connection between the output plug oPCR[1], stored in the output•plug•field, of the VCR 4 specified by the node ID stored in the nodeID•field of the received input•select•command and an appropriate input plug iPCR[0] of the TV 5.

Figure 10:
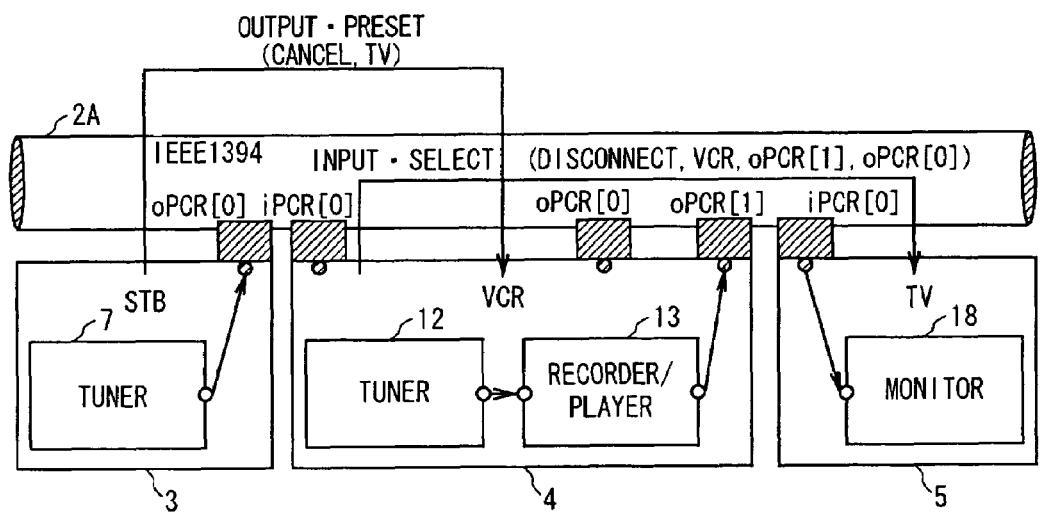
FIG. 10 is a schematic diagram explaining a case of canceling the PtoP connection.

When the STB 3 serving as the controller cancels the interdevice connection between the TV 5 serving as the sink and the VCR 4 serving as the source thereafter, it sends an output•preset•command indicative of cancellation to the VCR 4 serving as the source as shown in FIG. 10. Specifically, the STB 3 serving as the controller sends the command with a value included in a response received at the time of registration, stored in the preset•entry•number (preset_entry_number) field of the output•preset•command and with FFFF stored in the destination•nodeID•field and the signal•destination (signal_destination) field.

When the VCR 4 serving as the source receives this output•preset•command, it cancels the registration of the sink. Then the VCR 4 serving as the source checks own registration state to see if the TV 5 serving as the sink of which the cancellation is requested is registered in the other controllers or the VCR 4 itself, and if it is found from the result that the registration of the TV 5 has been all cancelled, then the VCR 4 sends an input•select•command with DISCONNECT specified in the subfunction•field to the TV 5 serving as the sink.

When the TV 5 serving as the sink receives this input•select•command, it cancels the interdevice connection with the VCR 4 serving as the source.

(3) Device Selection Processing

Sequentially, in this embodiment, the STB 3 operates as a controller, and performs device selection processing to logically connect an appropriate output plug of a source and an appropriate input plug of a sink corresponding to the output plug of the source, so as to set the VCR 4 as the source and set the TV 5 as the sink.

Figure 11:
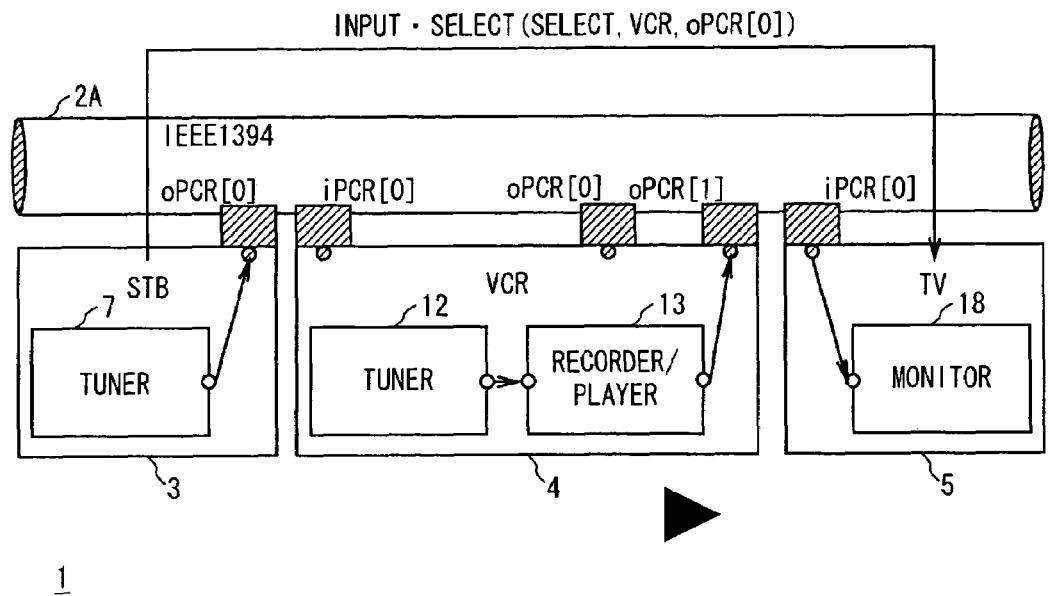
FIG. 11 is a schematic diagram explaining a case of registering the VCR as a source in the TV.

First, the STB 3 serving as the controller registers the VCR 4 as a source in the TV 5 as shown in FIG. 11. Specifically, the STB 3 serving as the controller sends an input•select•command to the TV 5. In this case, the STB 3 serving as the controller specifies SELECT in the subfunction•field of the input•select•command, specifies the node ID of the VCR 4 in the nodeID•field, and specifies an output plug number of default in the output•plug•field. In this connection, the output plug number of default can be set freely by the STB 3 serving as the controller.

When the TV 5 receives this input•select•command, it registers the specified node ID, i.e., the VCR 4 as a source.

Figure 12:
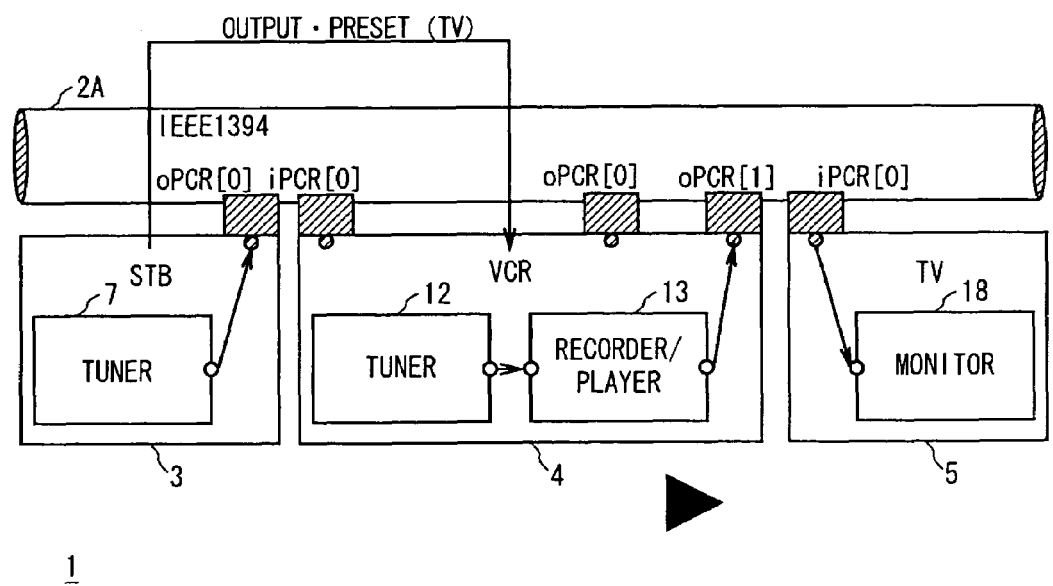
FIG. 12 is a schematic diagram explaining a case of registering the TV as a sink in the VCR.

Next, the STB 3 serving as the controller registers the TV 5 as a sink in the VCR 4 as shown in FIG. 12. Specifically, the STB 3 serving as the controller sends an output•preset•command to the VCR 4. In this case, the STB 3 serving as the controller specifies the node ID of the TV 5 in the destination•nodeID•field of the output•preset•command.

Figure 13:
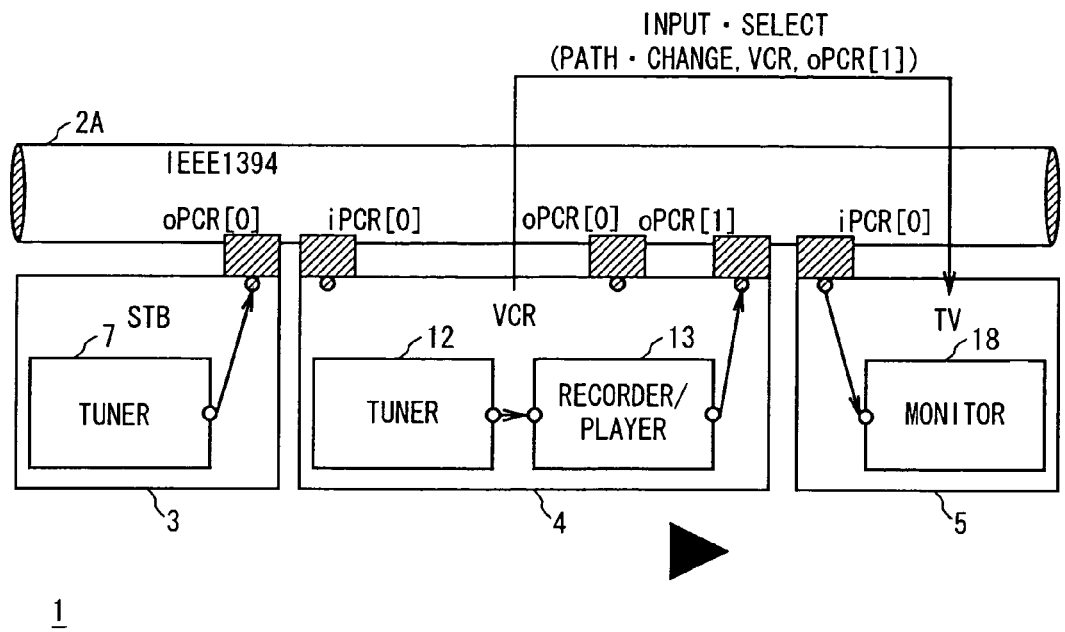
FIG. 13 is a schematic diagram explaining a case of registering an output plug in the TV.

When the VCR 4 serving as the source receives this output•preset•command, it judges whether to establish an interdevice connection now. If the VCR 4 serving as the source judges from the result that the VCR 4 is now, for example, performing playback operation and so is in a state where an interdevice connection should be established now, it sends an input•select•command to the TV 5 having the specified node ID as shown in FIG. 13. In this case, the VCR 4 serving as the source specifies PATH•CHANGE in the subfunction•field of the input•select•command, specifies the node ID of the VCR 4 itself in the nodeID•field, and specifies an appropriate output plug based on the signal path inside the VCR 4 in the output•plug•field.

Figure 14:
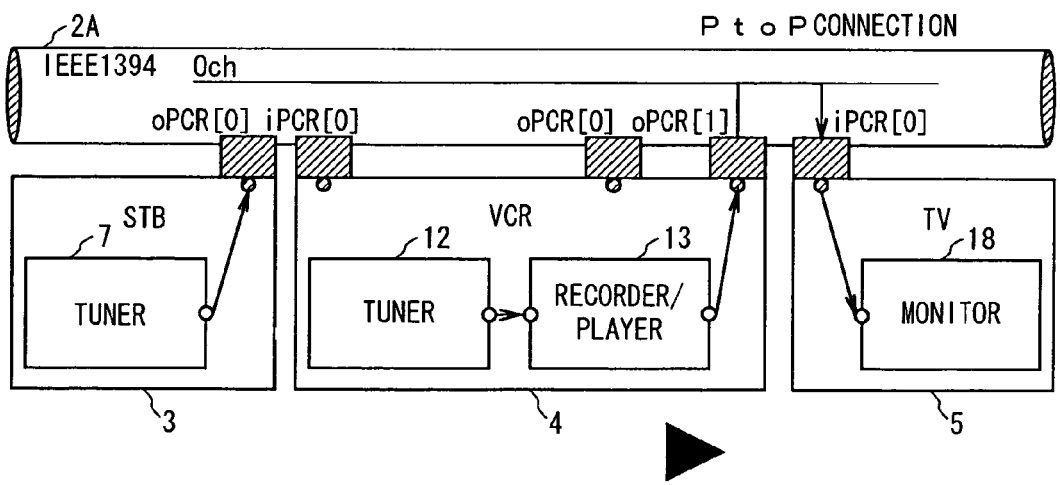
FIG. 14 is a schematic diagram explaining a case of establishing a PtoP connection.

Sequentially, when the TV 5 serving as the sink receives this input•select•command, it judges based on the output plug information attached to the input•select•command given whether to establish an interdevice connection. If the TV 5 serving as the sink judges from the result that it should establish an interdevice connection now, it establishes the interdevice connection based on the output plug information attached to the input•select•command given, as shown in FIG. 14.

That is, the TV 5 serving as the sink establishes a PtoP connection between the output plug oPCR[1], stored in the output•plug•field, of the VCR 4 specified by the node ID stored in the nodeID•field of the received input•select•command and the appropriate input plug iPCR[0] of the TV 5.

If the TV 5 serving as the sink judges that it should not establish the interdevice connection now, on the contrary, it only registers the output plug oPCR[1] stored in the output•plug•field of the received input•select•command without establishing the interdevice connection, and in this case, sends a rejected•response to the VCR 4 serving as the source.

When the TV 5 serving as the sink judges that its state is changed to the one where it should establish the interdevice connection thereafter, it establishes the interdevice connection based on the output plug information of the VCR 4 registered as the source.

By the way, in the case where the VCR 4 serving as the source receives the output•preset•command and judges that it is in a state where it should not establish the interdevice connection now, it only registers the TV 5 as a sink and does not send the input•select•command to the TV 5 serving as the sink.

Figure 15:
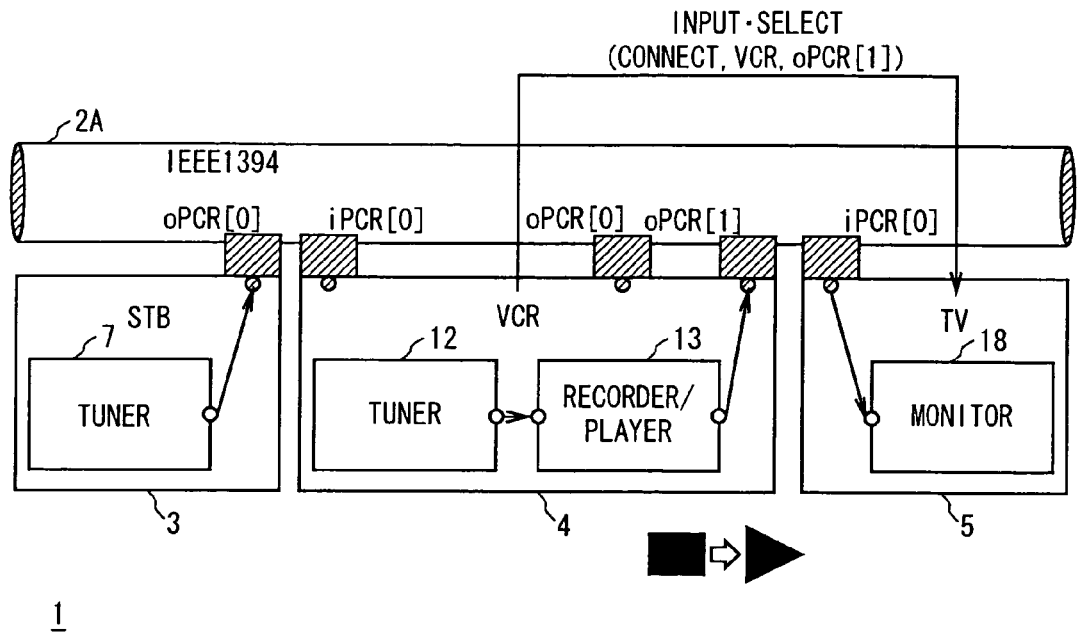
FIG. 15 is a schematic diagram explaining a case where the VCR starts output.

When the VCR 4 serving as the source judges that the VCR 4 has started output of AV data and its state is changed to the one where it should establish an interdevice connection thereafter, it sends an input•select•command to the TV 5 registered as the sink as shown in FIG. 15. In this case, the VCR 4 serving as the source specifies CONNECT in the subfunction•field of the input•select•command, and specifies an appropriate output plug based on the signal path inside the VCR 4 in the output•plug•field.

Figure 16:
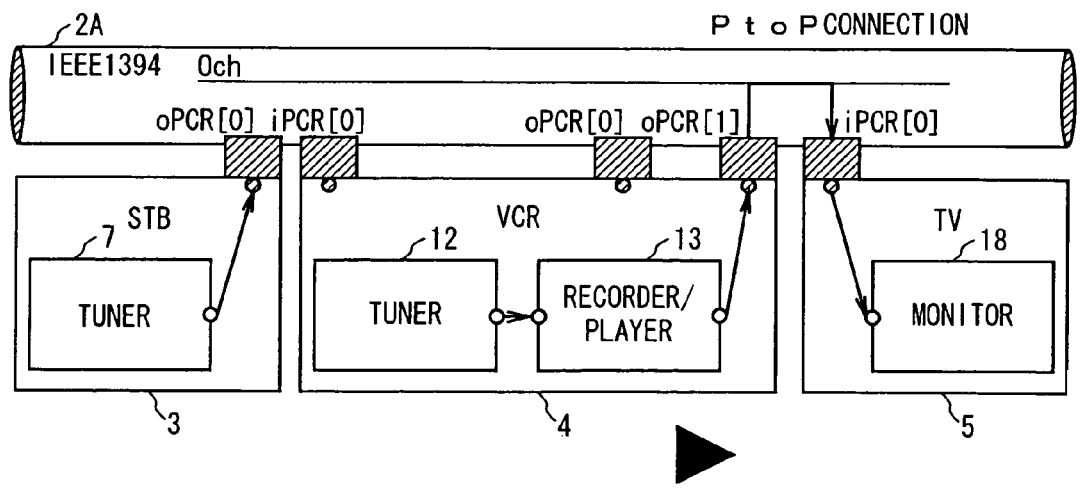
FIG. 16 is a schematic diagram explaining a case of establishing a PtoP connection.
Figure 17:
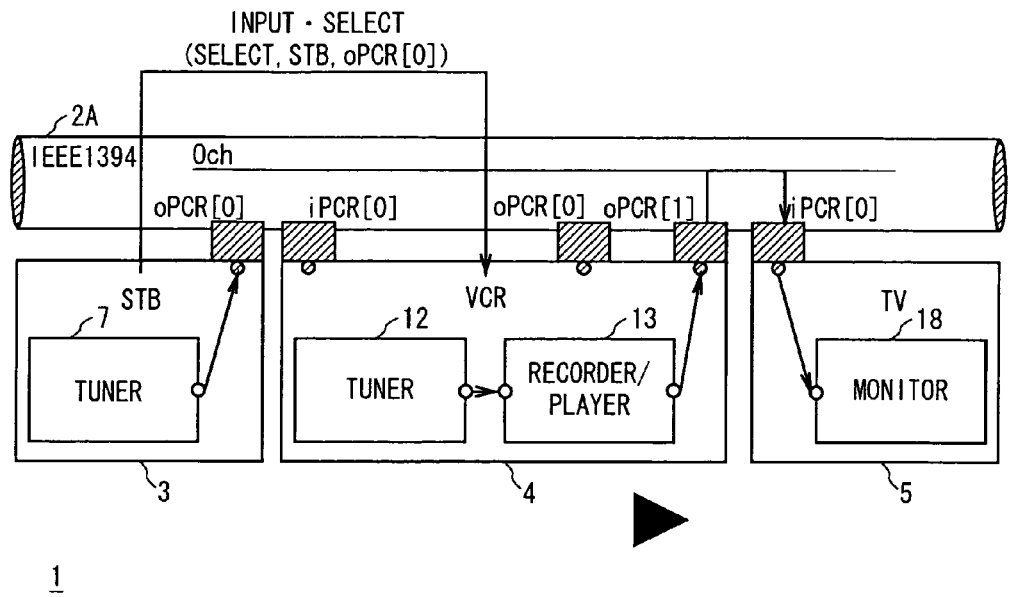
FIG. 17 is a schematic diagram explaining registration of a source by the STB.

Sequentially, when the TV 5 serving as the sink receives this input•select•command, it judges whether to establish an interdevice connection now. If the TV 5 serving as the sink judges from the result that it should establish an interdevice connection now, it establishes the interdevice connection based on the output plug information attached to the input•select•command given, as shown in FIG. 16.

Specifically, the TV 5 serving as the sink establishes a PtoP connection between the output plug oPCR[1], stored in the output•plug•field, of the VCR 4 specified by the node ID stored in the nodeID•field of the received input•select•command and the appropriate input plug iPCR [0] of the TV 5.

If the TV 5 serving as the sink judges that it should not establish an interdevice connection now, on the contrary, it only registers the output plug oPCR[1] stored in the output•plug•field of the received input•select•command without establishing the interdevice connection, and in this case, it sends a rejected•response to the VCR 4 serving as the source.

When the TV 5 serving as the sink judges that its state is changed to the one where it should establish an interdevice connection thereafter, it establishes an interdevice connection based on the output plug information of the VCR 4 registered as the source.

By the way, in the aforementioned case where the VCR 4 serving as the source is in a state where an interdevice connection should be established now and have sent an input•select•command to the TV 5 serving as the sink but the TV 5 is in a state where it should not establish the interdevice connection now, the VCR 4 receives a rejected•response from the TV 5. In addition, in the case where the VCR 4 serving as the source has registered the TV 5 as a sink and is in a state where an interdevice connection should be established now, it does not send an input•select•command.

In such cases, the VCR 4 serving as the source can not know which input plug of the TV 5 serving as the sink the TV 5 used to perform the source registration.

Therefore, under this state, when the VCR 4 serving as the source receives an output•preset•command indicative of cancellation of sink registration from the STB 3 serving as the controller, it generally sends to the TV 5 serving as the sink an input•select•command of which the subfunction•field is DISCONNECT.

However, if the VCR 4 serving as the source has not received an accepted•response from the TV 5 serving as the sink in response to the input•select•command, it can not know which input plug the TV 5 serving as the sink used to perform the source registration, and in this case, it can not send the input•select•command because it can not specify a plug to be stored in the input•plug•field of the input•select•command.

As a method of avoiding such inconvenience, there is such a method that the VCR 4 serving as the source checks which input plug the TV 5 serving as the sink is using to perform the source registration. Specifically, the VCR 4 serving as the source searches the input plugs of the TV 5 serving as the sink using a plug•info (PLUG INFO) command which is provided under the AV/C general (AV/C General).

The VCR 4 serving as the source sends to each of the obtained input plugs a status (STATUS) command of the input•select•command specifying the respective input plug, thereby knowing a source being selected by each input plug of the TV 5 serving as the sink or exist or absent of selection.

Then, when the VCR 4 serving as the source finds an input plug which selects the VCR 4 as the source, it sends an input•select•command having DISCONNECT in the subfunction with specifying the input plug. When the VCR 4 can not find an input plug which selects the VCR 4 as the source, on the contrary, it can not send an input•select•command having DISCONNECT in the subfunction, but there is no inconvenience because it is not necessary for the TV 5 serving as the sink to cancel registration.

In addition, as a method to avoid the above inconvenience, there is such a method that the VCR 4 serving as the source does not send an input•select•command having DISCONNECT in the subfunction if it does not receive an accepted•response from the TV 5 serving as the sink in response to an input•select•command even once.

In this case, the TV 5 serving as the sink remains the source registration. However, since the sink registration in the VCR 4 serving as the source gives priority to earlier registrations, if the number of registrations excesses the maximum number of registrations decided by the device, the following registrations are rejected. On the other hand, since the source registration in the TV 5 serving as the sink gives priority to latter registrations, unnecessary source registrations remain in the TV 5 serving as the sink, and the following source registrations by other controllers in the TV 5 serving as the sink do not cause any inconvenience.

Now, explanation will be made on a case where a device establishes an interdevice connection based on a source registration in the case where it performs only the source registration in an output state and then its state is changed to an input capable state from the output state, the device being capable of carrying out input processing and output processing but incapable of carrying out them at the same time.

In this description, it is assumed that the VCR 4 is a device which can carry out input processing and output processing but can not carry out them at the same time, the TV 5 is a controller and sink operating as a controller and sink, and the STB 3 is a controller and source operating as a controller and source.

First, the TV 5 operates as the controller and performs the device selection processing to thereby set the VCR 4 as a source and set the TV 5 as a sink, and when the VCR 4 serving as the source starts playback, it establishes an interdevice connection as shown in FIG. 16.

At this time, the STB 3, according to user operation, operates as the controller and performs the device selection processing, so as to thereby set the STB 3 as the source and the VCR 4 as the sink.

Specifically, the STB 3 serving as the controller sends an input•select•command having SELECT in the subfunction to the VCR 4 while the VCR 4 is performing playback operation. When the VCR 4 receives this input•select•command, it registers the STB 3 as a source. Sequentially, in the STB 3, the functional blocks operating as the controller register the VCR 4 as a sink in the functional blocks operating as the source.

Figure 18:
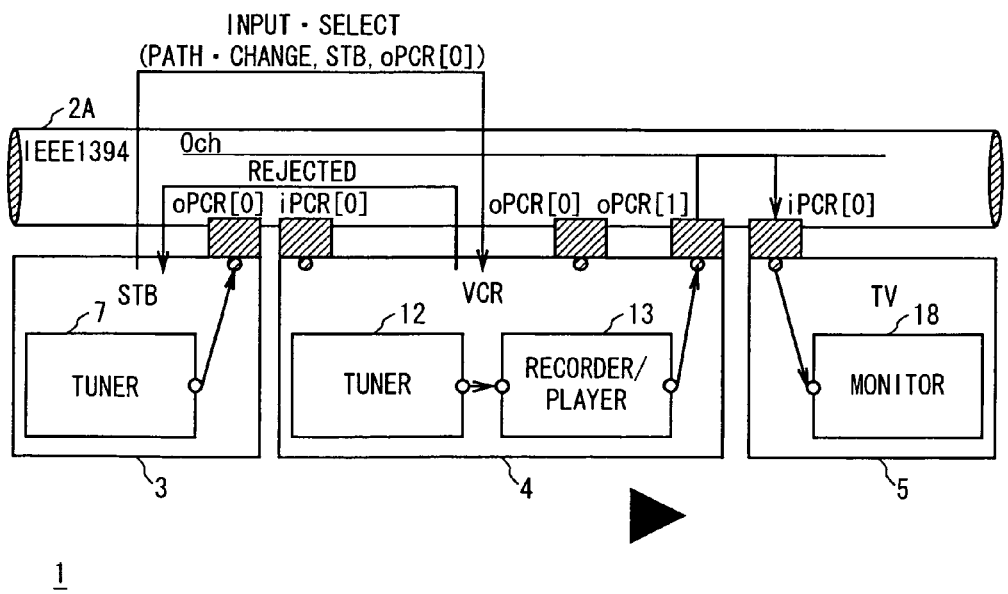
FIG. 18 is a schematic diagram explaining a case of transmitting a rejected•response from the VCR.

Then, the STB 3 operating as the source sends an input•select•command having PATH•CHANGE in the subfunction to the VCR 4 being in an output state as shown in FIG. 18.

Since the VCR 4 operating as the sink can not perform input operation because it is now performing output operation, it can not use an interdevice connection effectively even the interdevice connection is established, and therefore bus resources can not be used effectively. In such a case, the interdevice connection should not be established.

Therefore, the VCR 4 operating as the sink sends a rejected•response to the STB 3 as shown in FIG. 18. In this case, the VCR 4 stores the output plug information of the STB 3 stored in the output•field of the input•select•command.

Figure 19:
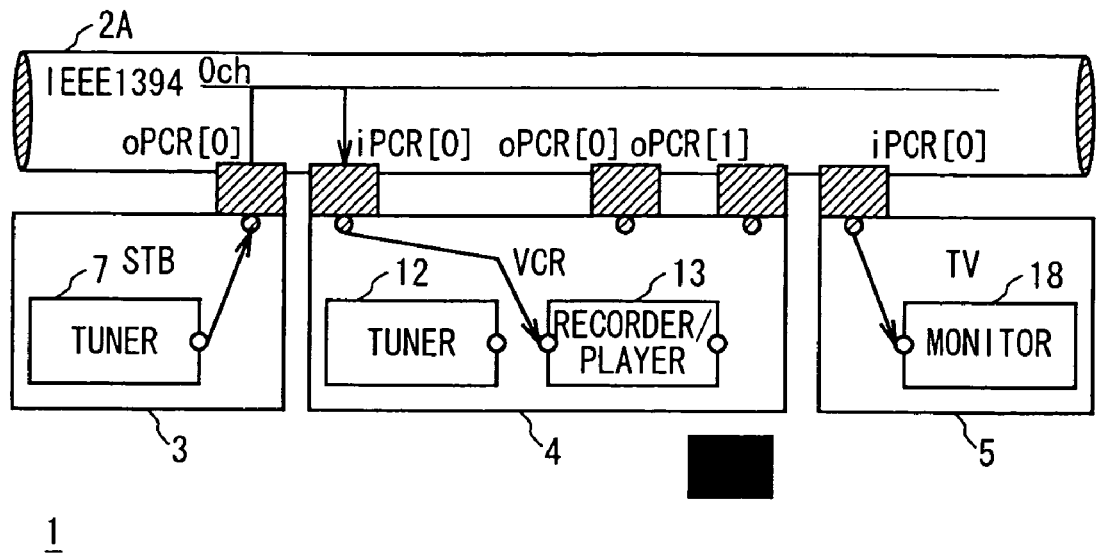
FIG. 19 is a schematic diagram explaining a case of establishing an interdevice connection.

When the VCR 4 operating as the sink finishes the playback operation thereafter, it establishes an interdevice connection with the STB 3 based on the stored source registration as shown in FIG. 19. In this connection, the VCR 4 can establish an appropriate interdevice connection by using the output plug information stored for the output plug of the STB 3.

(4) Operation Including Auto-Play Processing, Device Selection Processing, and Path Information Notification Processing by Source Now, operation of a sink is firstly prescribed for a case where the sink receives an input•select•command. In this case, when the sink receives the input•select•command, it determines its operation based on the subfunction specified by the subfunction•field of the input•select•command and on whether the source specified by the nodeID•field is a device registered as a source in the sink. It should be noted that a device registered as a source does not necessarily have an interdevice connection.

That is, when the subfunction•field of the received input•select•command shows CONNECT, the sink registers the source specified by the nodeID•field and establishes an interdevice connection with the registered source.

When the subfunction•field of the received input•select•command shows SELECT, on the other hand, the sink registers the source specified by the nodeID•field and may not establish an interdevice connection with the registered source.

When the subfunction•field of the received input•select•command shows PATH•CHANGE and the source specified by the nodeID•field is registered as a source in the sink, on the other hand, the sink establishes an interdevice connection with the source.

When the subfunction•field of the received input•select•command shows PATH•CHANGE and the source specified by the nodeID•field is not registered as a source in the sink, on the contrary, the sink necessarily sends a rejected•response to reject the change of source registration to the specified device and the establishment of an interdevice connection with the specified source.

In addition, when the subfunction•field of the received input•select•command shows DISCONNECT, the sink changes its state to the one where it does not establish an interdevice connection with the source specified by the nodeID•field.

By the way, in this embodiment, explanation will be made on a case where the auto-play processing, device selection processing and path information notification by a source are sequentially performed in the network system 1, the TV 5 operates as a controller and a sink, and the STB 3 and VCR 4 operate as sources.

Figure 20:
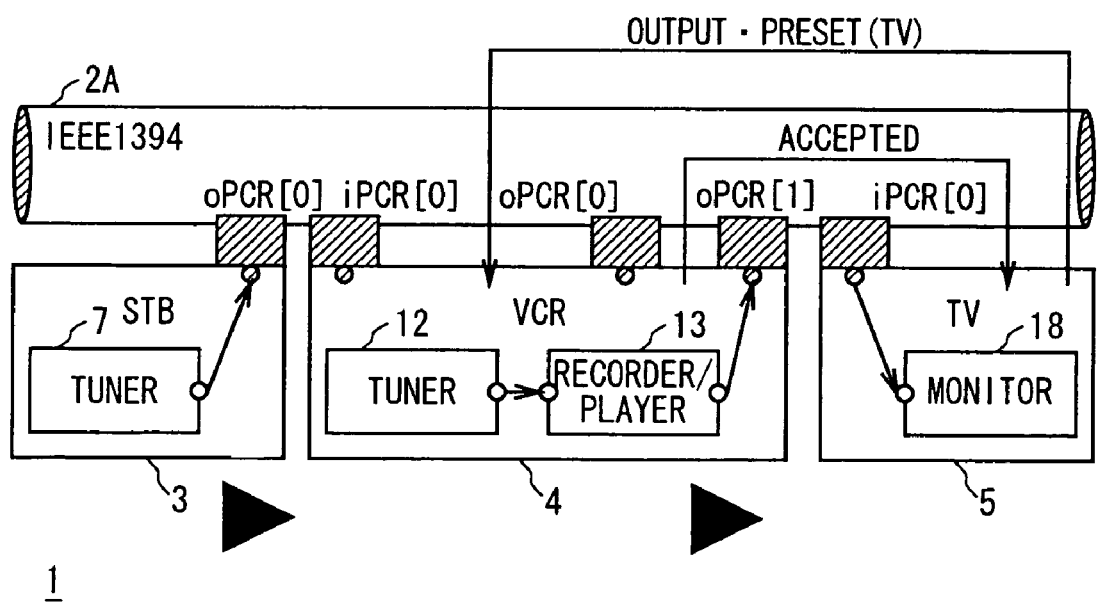
FIG. 20 is a schematic diagram explaining a case of registering the TV as a sink in the VCR.

First, the TV 5 operates so as to set the VCR 4 for the auto-play processing. Specifically, the TV 5 operating as the controller sends an output•preset•command with the node ID of the TV 5 specified in the destination•nodeID•field as shown in FIG. 20. When the VCR 4 serving as the source receives this output•preset•command, it registers the TV 5 as a sink.

Then, if the VCR 4 serving as the source determines that it is now in a stop mode and is in a state where it should not establish an interdevice connection, it does not send an input•select•command to the TV 5 serving as the sink. This case means that the VCR 4 has been set for the auto-play processing.

Figure 21:
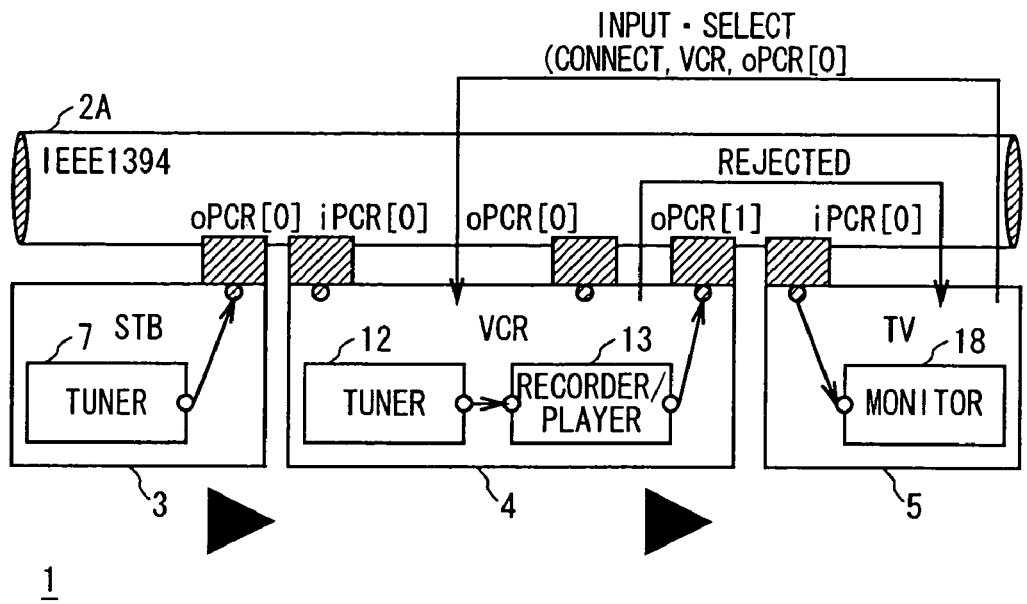
FIG. 21 is a schematic diagram explaining a case of transmitting a rejected•response.

When the VCR 4 serving as the source determines that it is now performing playback operation and is in a state where it should establish an interdevice connection, on the contrary, it sends an input•select•command to the TV 5 serving as the sink as shown in FIG. 21. In this case, the VCR 4 serving as the source specifies PATH•CHANGE in the subfunction•field of the input•select•command, specifies the node ID of the VCR 4 itself in the nodeID•field, and specifies an appropriate output plug based on a signal path inside the VCR 4 in the output•plug•field.

When the TV 5 serving as the sink receives this input•select•command, it judges whether the VCR 4 specified by the nodeID•field is registered as a source since the subfunction•field of the input•select•command shows PATH•CHANGE. In this case, the TV 5 serving as the sink judges that it does not register the VCR 4 as a source, and sends a rejected•response to the VCR 4. Thereby, the VCR 4 has been set for the auto-play processing.

Figure 22:
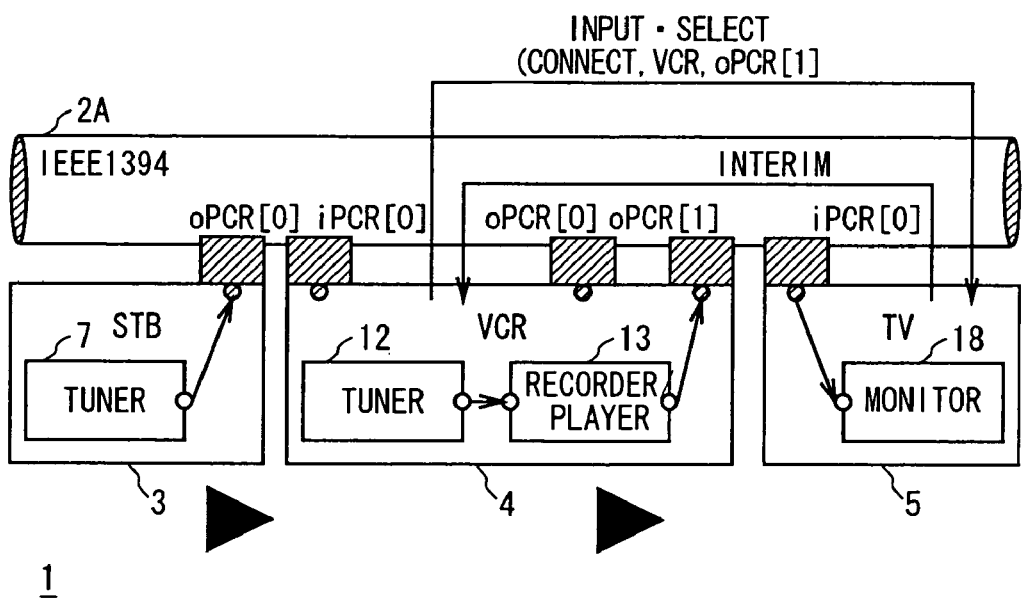
FIG. 22 is a schematic diagram explaining a case where the VCR starts output.

When the VCR 4 serving as the source starts playback operation according to user operation under this condition, it sends an input•select•command to the TV 5 serving as the sink as shown in FIG. 22. In this case, the VCR 4 serving as the source specifies CONNECT in the subfunction•field of the input•select•command, specifies the node ID of the VCR 4 itself in the nodeID•field, and specifies an appropriate output plug based on a signal path inside the VCR 4 in the output•plug•field.

Figure 23:
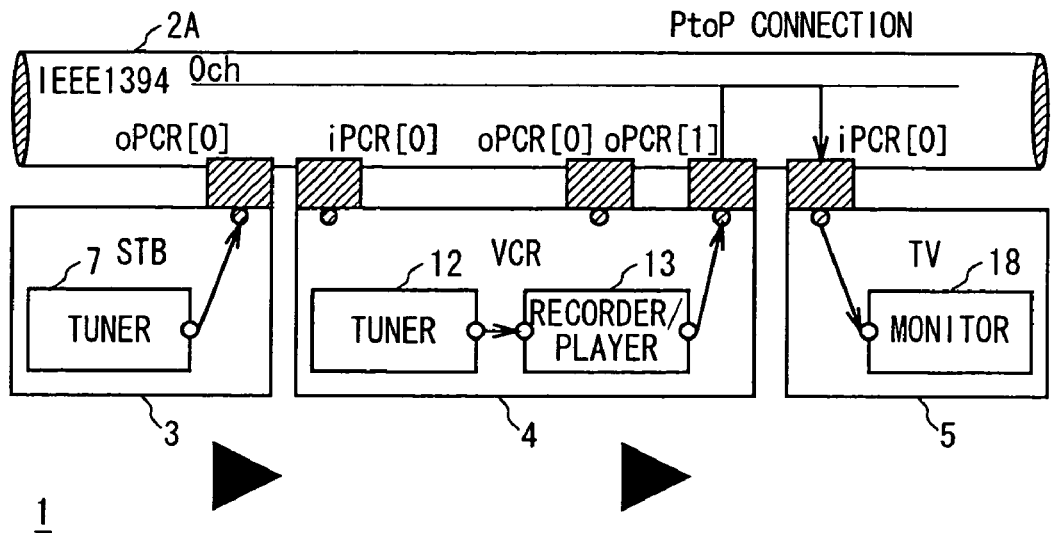
FIG. 23 is a schematic diagram explaining a case of establishing a PtoP connection.

When the TV 5 serving as the sink receives this input•select•command, it establishes an interdevice connection with the VCR 4 as shown in FIG. 23.

Figure 24:
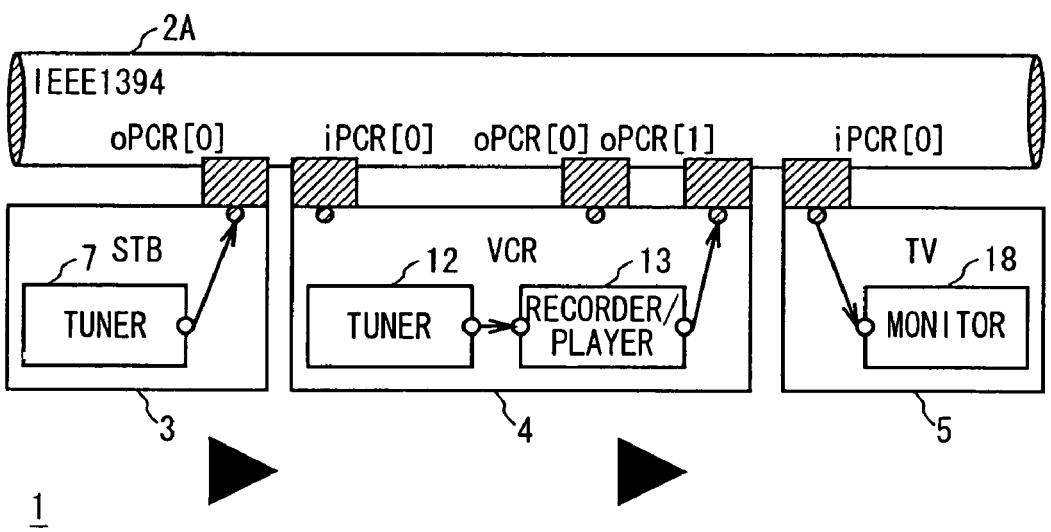
FIG. 24 is a schematic diagram explaining a case of canceling the PtoP connection.

Sequentially, the TV 5 operates as the controller and performs operation to register the STB 3 as a source in order to switch images being displayed on the monitor from the output images of the VCR 4 to the output images of the STB 3. Specifically, in the TV 5, the functional blocks operating as the controller register the STB 3 as a source in own functional blocks operating as the sink. In this case, an interdevice connection between the VCR 4 and the TV 5 is cancelled as shown in FIG. 24.

Figure 25:
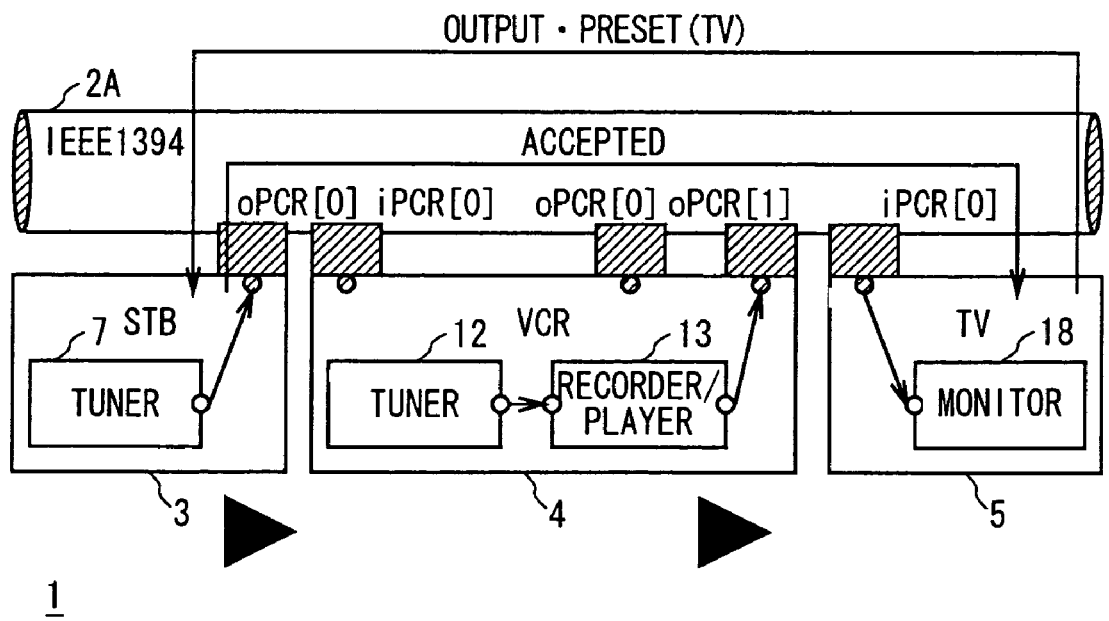
FIG. 25 is a schematic diagram explaining a case of registering the TV as a sink in the STB.

Next, the TV 5 operating as the controller sends to the STB 3 serving as the source an output•preset•command with the node ID of the TV 5 specified in the destination•nodeID•field, so as to thereby register the TV 5 as a sink in the STB 3 as shown in FIG. 25.

Figure 26:
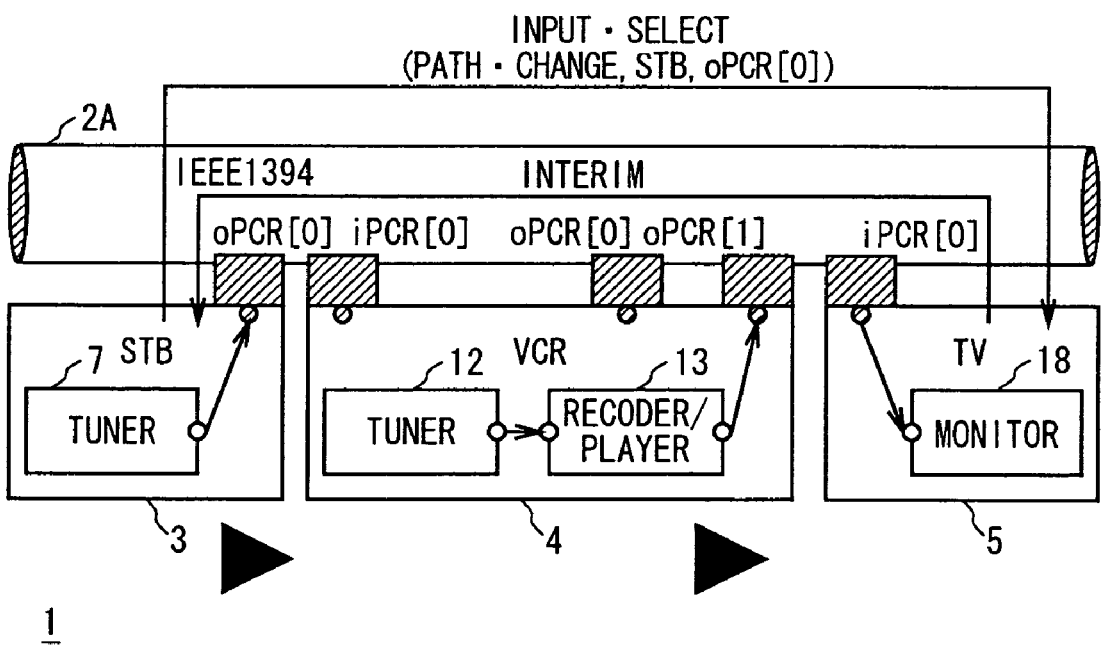
FIG. 26 is a schematic diagram explaining a case of registering an output plug in the TV.

In the case where the STB 3 serving as the source is outputting AV data, it sends an input•select•command to the TV 5 serving as the sink as shown in FIG. 26. In this case, the STB 3 serving as the source specifies PATH•CHANGE in the subfunction•field of the input•select•command, specifies the node ID of the STB 3 itself in the nodeID•field, and specifies an appropriate output plug based on a signal path inside the STB 3 in the output•plug•field.

Figure 27:
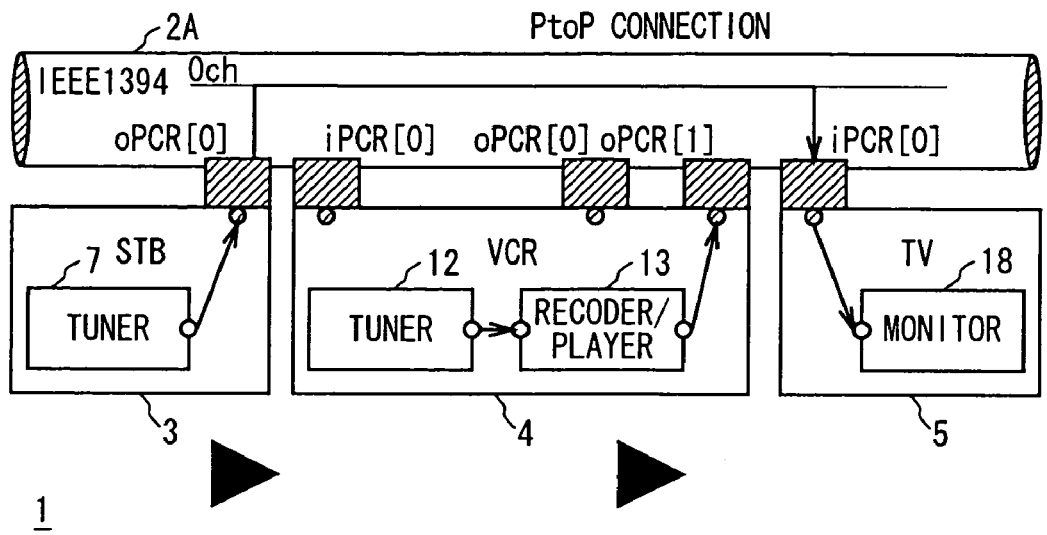
FIG. 27 is a schematic diagram explaining a case of establishing a PtoP connection.

When the TV 5 serving as the sink receives this input•select•command, it establishes an interdevice connection with the STB 3 since it has registered the STB 3 as shown in FIG. 27.

Figure 28:
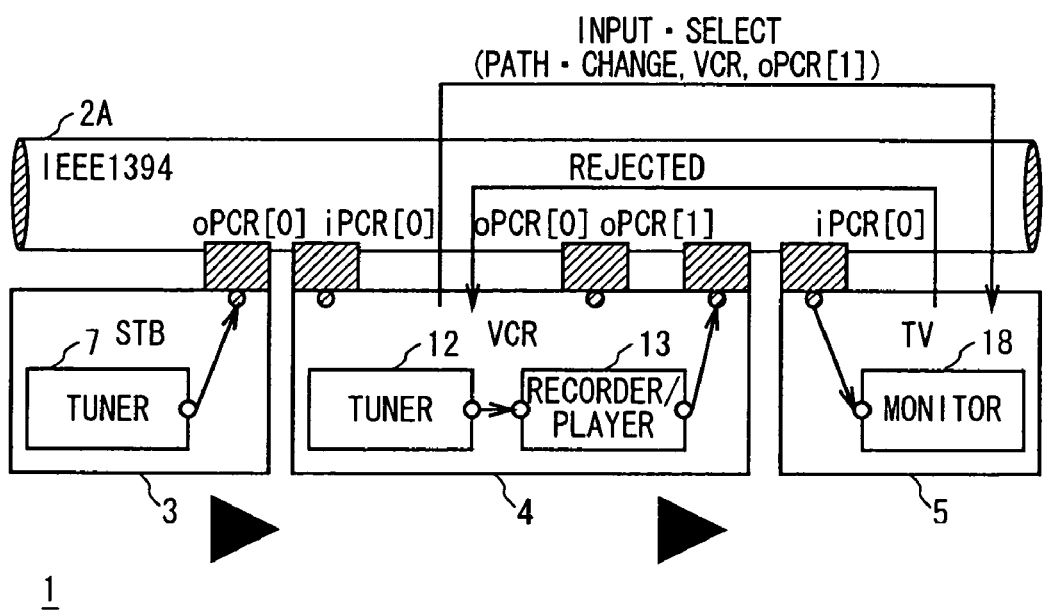
FIG. 28 is a schematic diagram explaining a case of transmitting a rejected•response.

In the case where the VCR 4 serving as the source changes its state, such as change of an appropriate output plug, the VCR 4 sends an input•select•command to the TV 5 registered as a sink, so as to notify new output plug information. In this case, the VCR 4 serving as the source specifies PATH•CHANGE in the subfunction•field of the input•select•command, specifies the node ID of the VCR 4 itself in the nodeID•field, and specifies the appropriate output plug after change in the output•plug•field, as shown in FIG. 28.

When the TV 5 serving as the sink receives this input•select•command, it judges whether the VCR 4 specified by the nodeID•field is registered as a source, because the subfunction•field of the input•select•command shows PATH•CHANGE. In this case, the TV 5 serving as the sink judges that it does not register the VCR 4 as a source, and then it sends a rejected•response to the VCR 4 and does not change the interdevice connection.

As described above, the TV 5 serving as the sink can avoid the switch of images to be displayed on the monitor 18 from output images of the STB 3 to output images of the VCR 4, thus making it possible to avoid the switch of images to be displayed which is not performed by user operation.

(5) Processing Procedures for Controller, Source, and Sink

Figure 29:
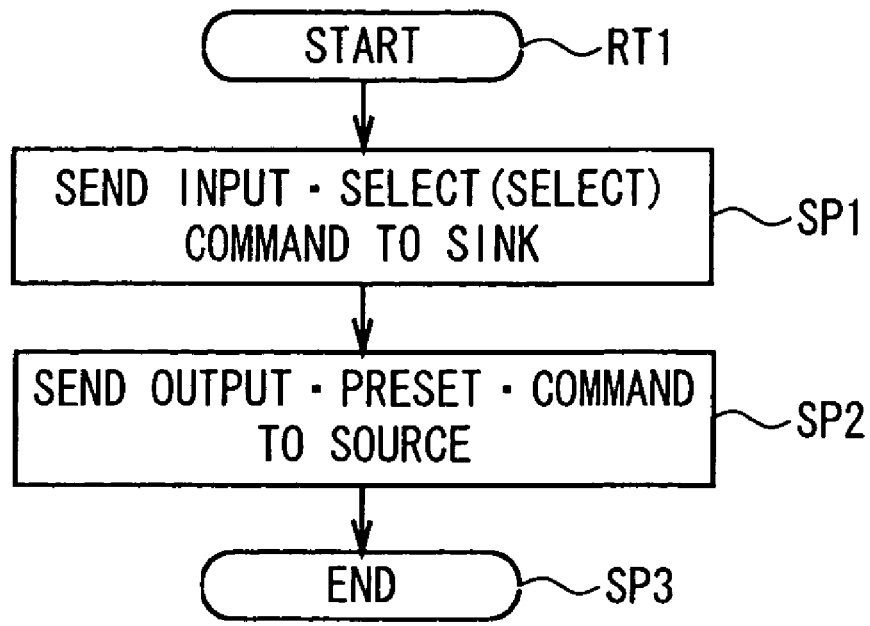
FIG. 29 is a flowchart showing a device selection setting processing procedure by a controller.

Now, FIG. 29 shows the device selection setting processing procedure RT1 by a controller. The controller starts the device selection setting processing procedure RT1 in FIG. 29, and then sends an input•select•command with SELECT specified in the subfunction•field to a sink at step SP1.

The controller moves on to next step SP2 where it sends an output•preset•command to a source to establish an interdevice connection, and then moves on to step SP3 where the processing procedure RT1 is completed.

Figure 30:
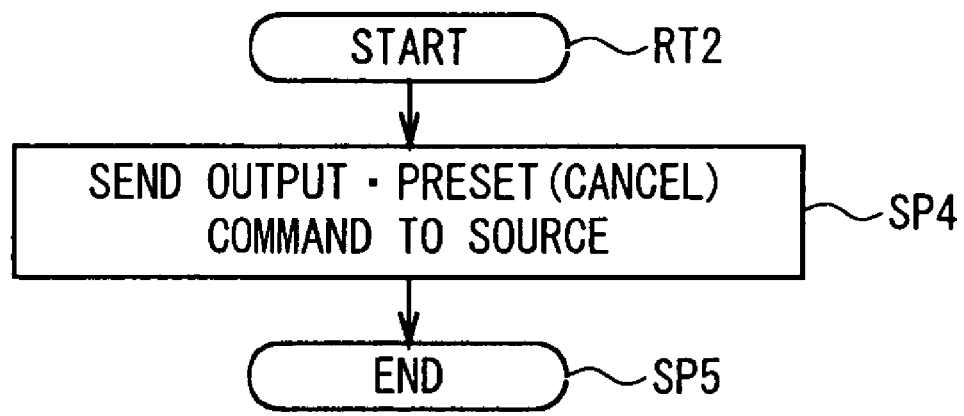
FIG. 30 is a flowchart showing the device selection setting processing procedure by the controller.

When the interdevice connection is cancelled thereafter, the controller performs the device selection setting processing procedure RT2 shown in FIG. 30. The controller starts the device selection setting processing procedure RT2 in FIG. 30, sends an output•preset•command indicative of cancellation to the source at step SP4 to cancel the interdevice connection, and then moves on to step SP5 where this processing procedure RT2 is completed.

Figure 31:
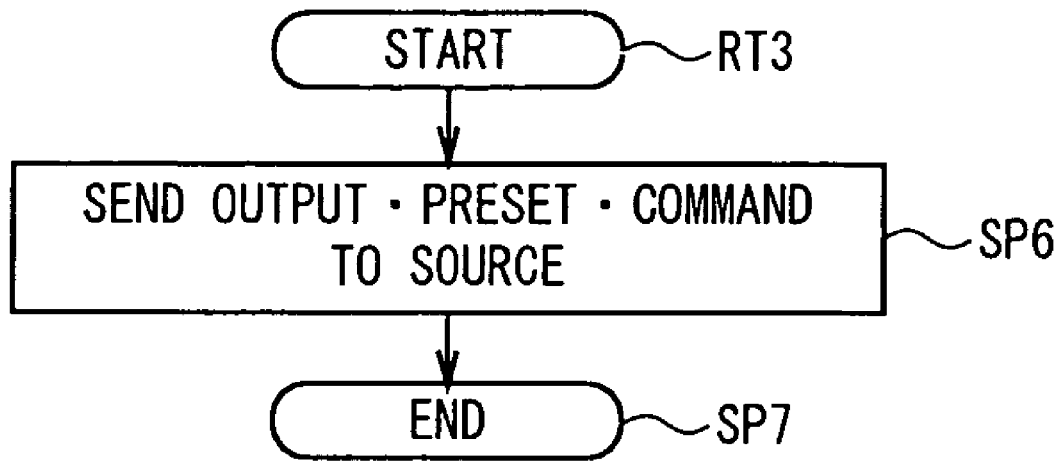
FIG. 31 is a flowchart showing an auto-play setting processing procedure by the controller.

Further, FIG. 31 shows the auto-play setting processing procedure RT3 which is performed by the controller. Specifically, the controller starts the auto-play setting processing procedure RT3 in FIG. 31, sends an output•preset•command to the source at step SP6 to perform the auto-play setting, and then moves on to step SP7 where this processing procedure RT3 is completed.

Figure 32:
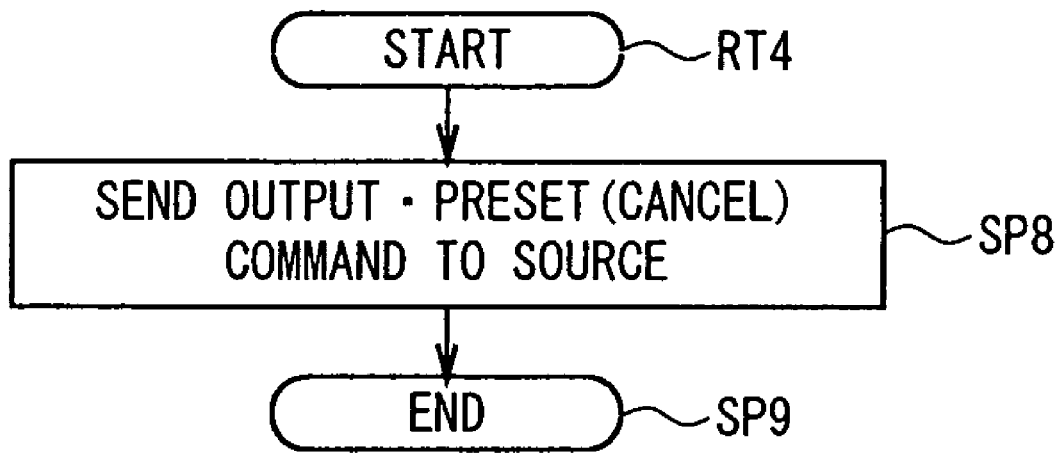
FIG. 32 is a flowchart showing the auto-play setting processing procedure by the controller.

When the controller cancels the auto-play setting thereafter, it carries out the auto-play setting processing procedure RT4 shown in FIG. 32. The controller starts the auto-play setting processing procedure RT4 in FIG. 32, moves on to step SP8 where it sends an output•preset•command indicative of cancellation to the source to cancel the auto-play setting, and then moves on to step SP9 where this processing procedure RT4 is completed.

Figure 33:
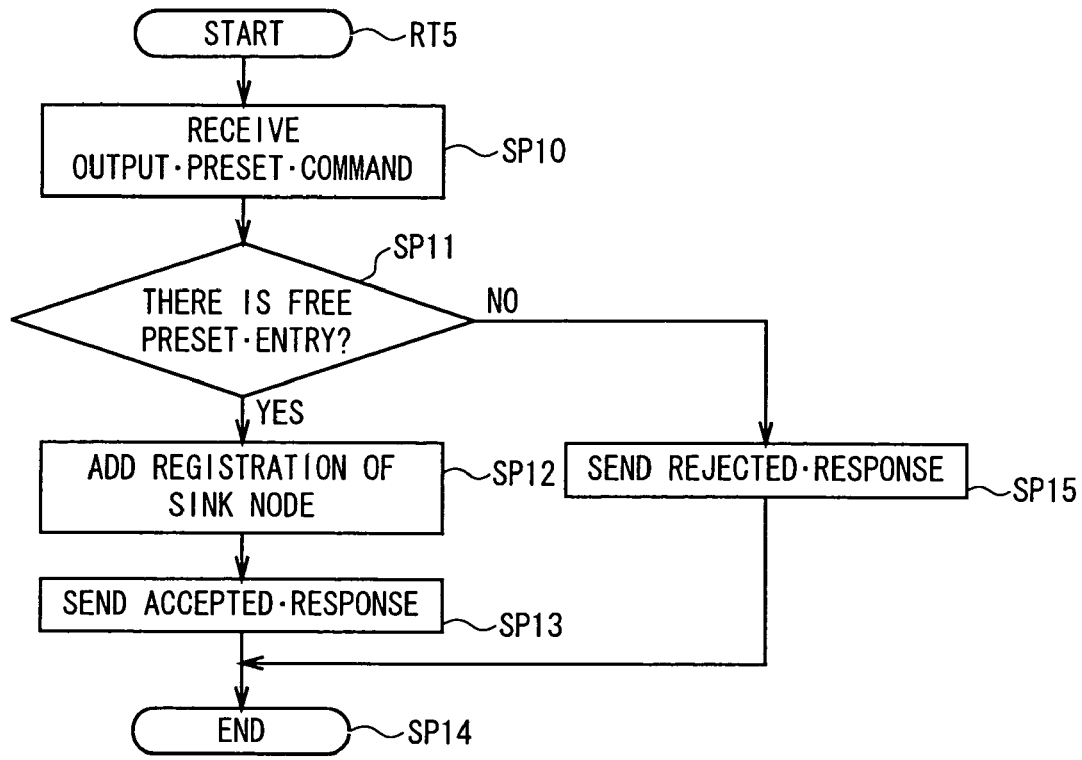
FIG. 33 is a flowchart showing a processing procedure by a source in a state where an interdevice connection should not be established.
Figure 34:
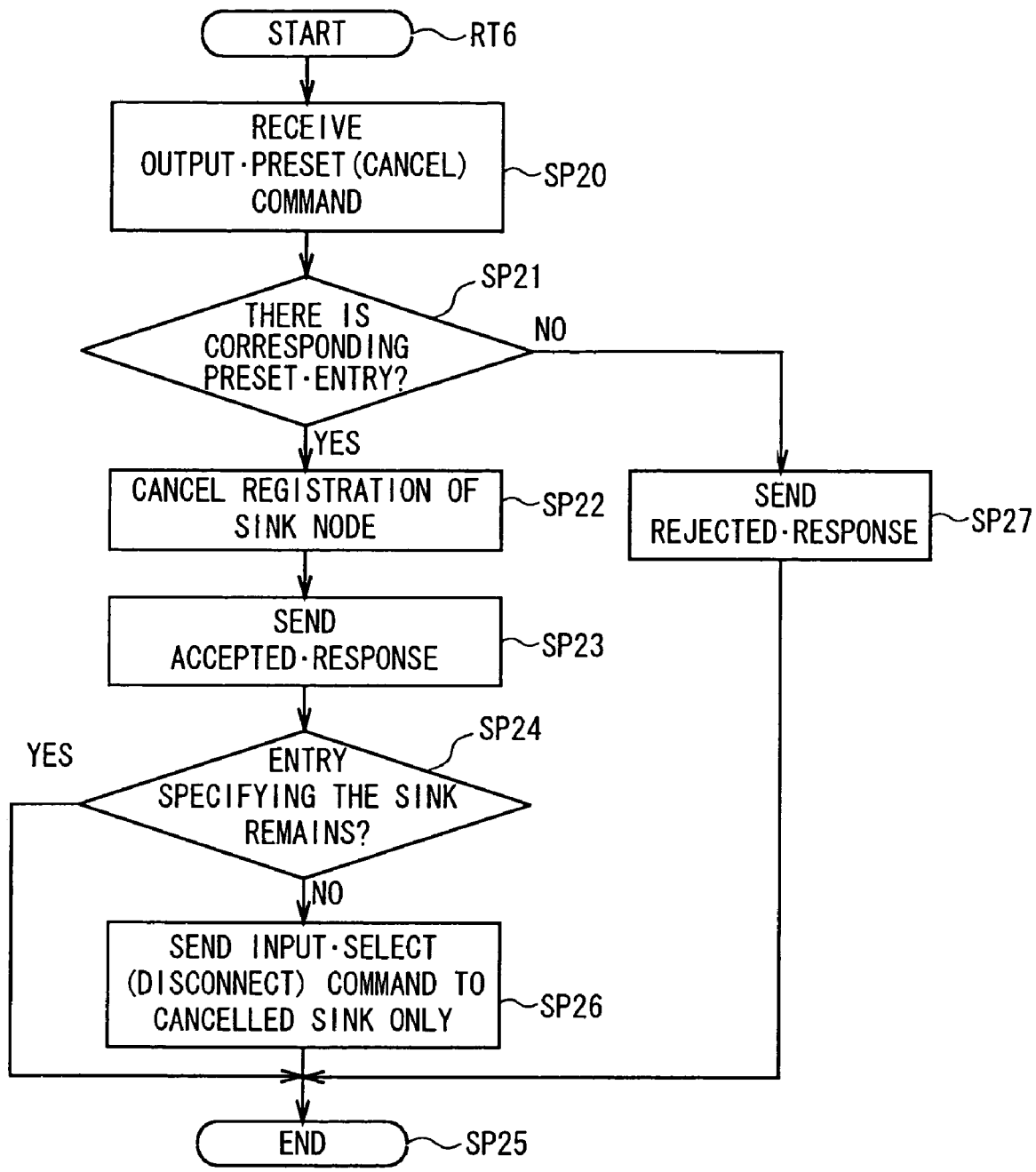
FIG. 34 is a flowchart showing the processing procedure by the source in a state where an interdevice connection should not be established.
Figure 35:
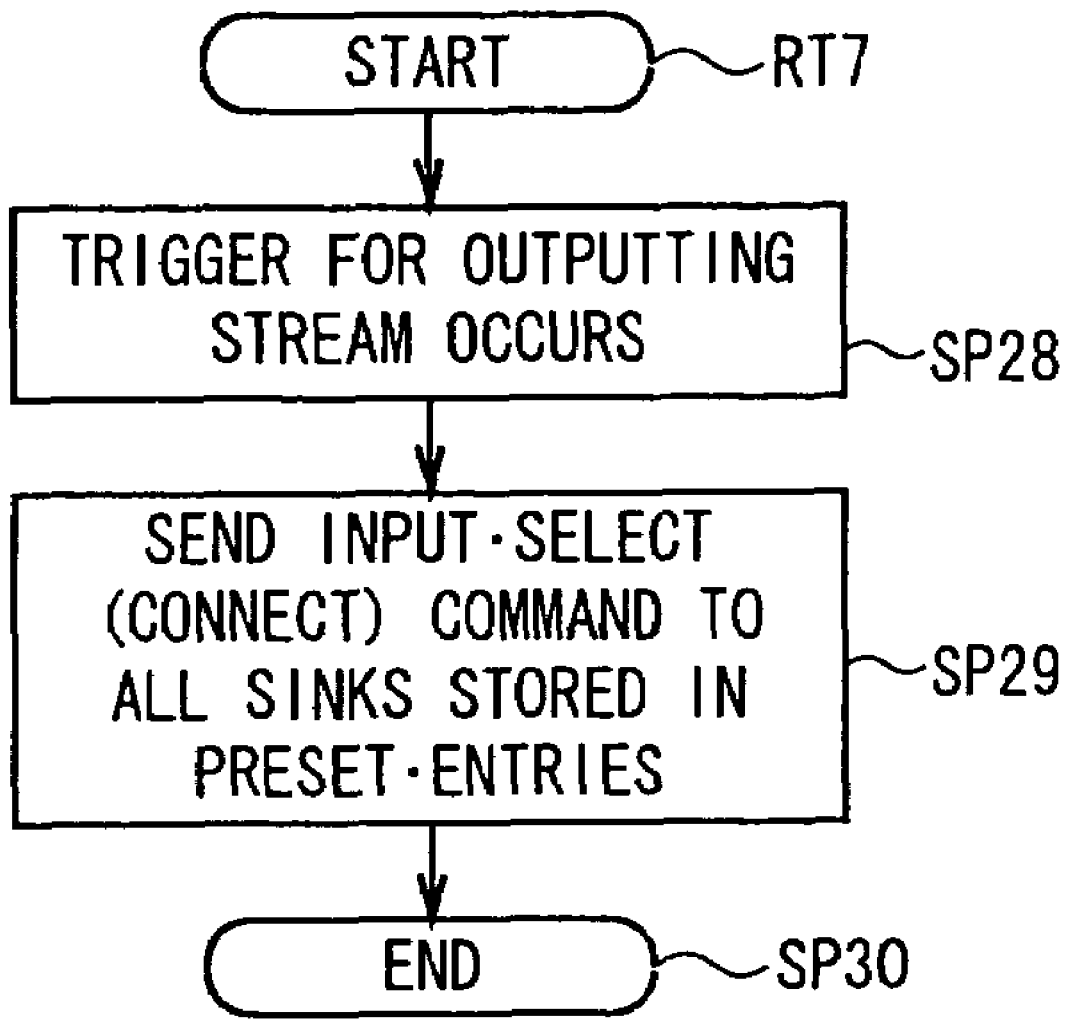
FIG. 35 is a flowchart showing the processing procedure by the source in a state where an interdevice connection should not be established.
Figure 36:
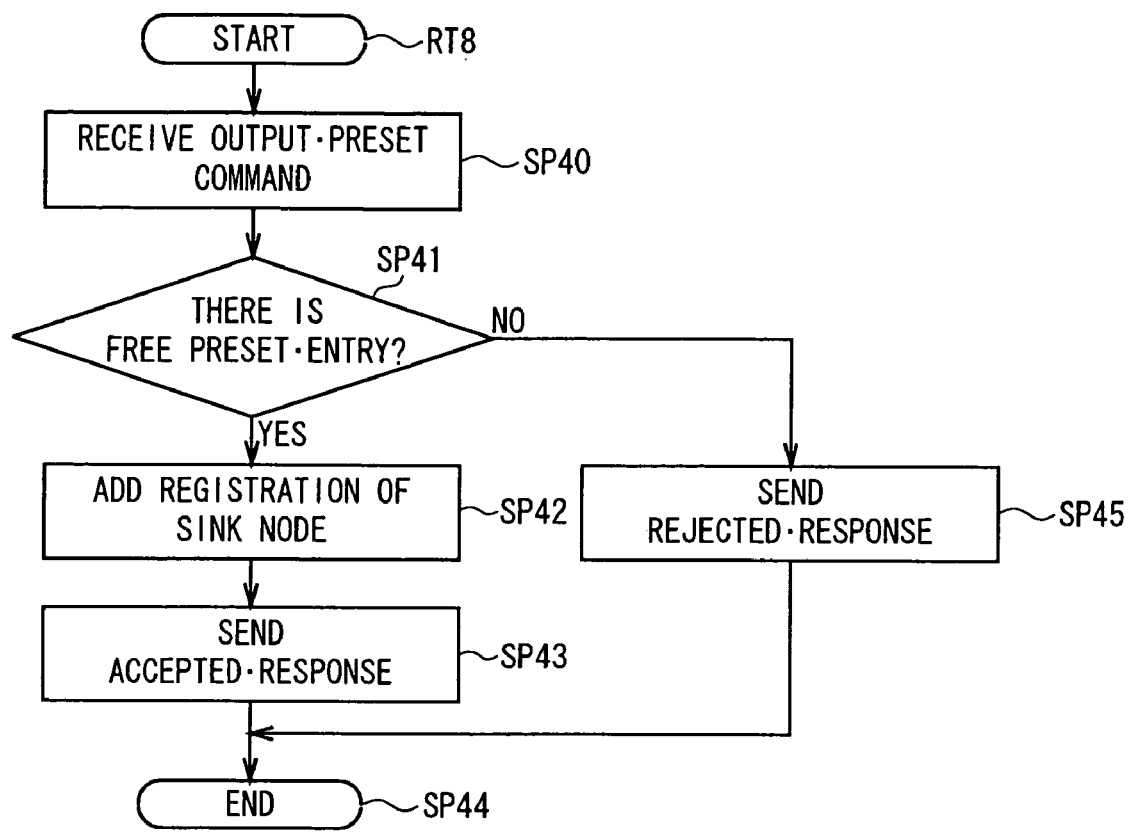
FIG. 36 is a flowchart showing a processing procedure by a source in a state where an interdevice connection should be established.

Now, FIG. 33 to FIG. 35 show processing procedures RT5 to RT7 which are carried out by the source in a state where an interdevice connection should not be established. In this case, when an output•preset•command is sent from the controller, the source carries out the processing procedure RT5 shown in FIG. 33. Specifically, in this FIG. 33, the source starts the processing procedure RT5, and when it receives the output•preset•command at step SP10, it moves on to next step SP11 where it judges whether there is free preset•entry (PRESET ENTRY).

An affirmative result at step SP11 means that there is free preset•entry, and in this case, the source moves on to step SP12 where it adds the registration of the sink node. Then, the source sends an accepted•response to the controller at step SP13, and moves on to next step SP14 where the processing procedure RT5 is completed.

A negative result at step SP11, on the contrary, means that there is no free preset•entry, and in this case, the source moves on to step SP15 where it sends a rejected•response to the controller and then moves to next step SP14 where the processing procedure RT5 is completed.

On the other hand, when an output•preset•command indicative of cancellation is sent from the controller, the source carries out the processing procedure RT6 shown in FIG. 34. Specifically, the source starts the processing procedure RT6 in FIG. 34, moves on to step SP21 where it judges whether there is the corresponding preset•entry.

An affirmative result at step SP21 means that there is the corresponding preset•entry, and in this case, the source moves on to step SP22 where the registration of the sink node is cancelled. Then, the source sends an accepted•response to the controller at step SP23, and moves on to step SP24 where it judges whether an entry specifying the sink remains.

An affirmative result at step SP24 means that an entry specifying the sink remains, and in this case, the source moves on to step SP25 where the processing procedure RT6 is completed.

A negative result at step SP24, on the contrary, means that no entry specifying the sink remains, and in this case, the source moves on to step SP26 where it sends an input•select•command with DISCONNECT specified in the subfunction to the deleted sink only, and moves on to step SP25 where the processing procedure RT6 is completed.

By the way, a negative result at step SP21 means that there is no corresponding preset•entry, and in this case, the source sends a rejected•response to the controller at step SP27, and moves on to step SP25 where the processing procedure RT6 is completed.

Further, the source carries out the processing procedure RT7 shown in FIG. 35 when a trigger such as the start of output of AV data occurs. Specifically, the source starts the processing procedure RT7 in FIG. 35, determines at step SP28 that the trigger such as the start of output of AV data has occurred, moves on to next step SP29 where it sends an input•select•command with CONNECT specified in the subfunction to all sinks stored in the preset•entries, and then moves on to step SP30 where the processing procedure RT7 is completed.

Now, FIG. 36 to FIG. 39 show processing procedures RT8 to RT11 which are performed by the source in a state where an interdevice connection should be established. In this case, when an output•preset•command is sent from the controller, the source starts the processing procedure RT8 shown in FIG. 36. Specifically, the source starts the processing procedure RT8 in FIG. 36, receives the output•preset•command at step SP40, and then moves on to next step SP41 where it judges whether there is free preset•entry.

An affirmative result at step SP41 means that there is free preset•entry, and in this case, the source moves on to step SP42 where it adds the registration of the sink node. Then, the source sends an accepted•response to the controller at step SP43, and moves on to next step SP44 where the processing procedure RT18 is completed.

A negative result at step SP41, on the contrary, means that there is no free preset•entry, and in this case, the source sends a rejected•response to the controller at step SP45, and moves on to next step SP44 where the processing procedure RT8 is completed.

Figure 37:
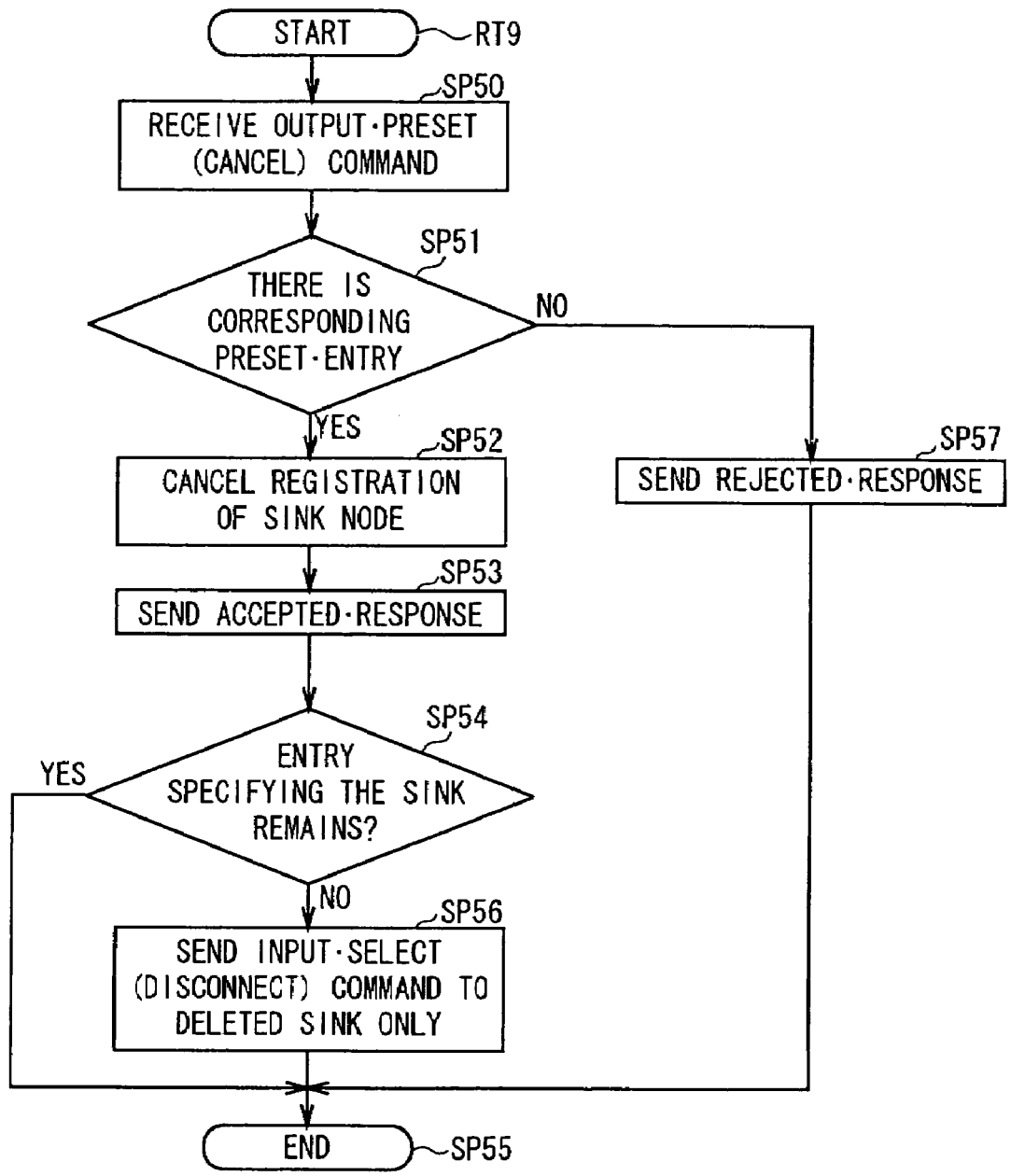
FIG. 37 is a flowchart showing a processing procedure by the source in a state where an interdevice connection should be established.

On the other hand, when an output•preset•command indicative of cancellation is sent from the controller, the source carries out the processing procedure RT9 shown in FIG. 37. Specifically, the source starts the processing procedure RT9 in FIG. 37, receives the output•preset•command indicative of cancellation at step SP50, and then moves on to next step SP51 where it judges whether there is the corresponding preset•entry.

An affirmative result at step SP51 means that there is the corresponding preset•entry, and in this case, the source moves on to step SP52 where it cancels the registration of the sink node. Then the source sends an accepted•response to the controller at step SP53, and moves on to next step SP54 where it judges whether an entry specifying the TV 5 as a sink remains.

An affirmative result at step SP54 means that an entry specifying the sink remains, and in this case, the source moves on to step SP55 where the processing procedure RT9 is completed.

A negative result at step SP54, on the contrary, means that no entry specifying the sink remains, and in this case, the source moves on to step SP56 where it sends an input•select•command with DISCONNECT specified in the subfunction to the deleted sink only, and moves on to step SP55 where the processing procedure RT9 is completed.

By the way, a negative result at step SP51 means that there is no corresponding preset•entry, and in this case, the source moves on to step SP57 where it sends a rejected•response to the controller, and moves on to step SP55 where the processing procedure RT9 is completed.

Figure 38:
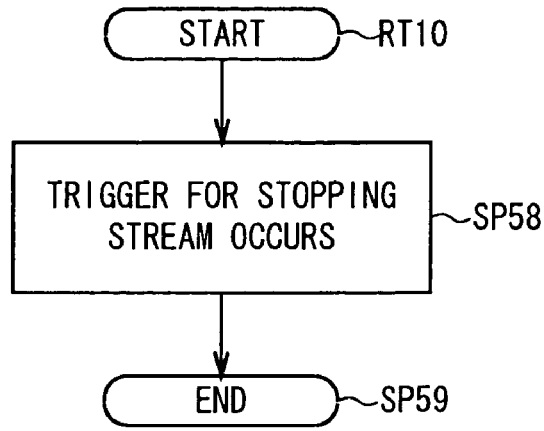
FIG. 38 is a flowchart showing a processing procedure by the source in a state where an interdevice connection should be established.

Further, when such a trigger as to stop outputting AV data occurs, the source performs the processing procedure RT10 shown in FIG. 38. Specifically, the source starts the processing procedure RT10 in FIG. 38, determines at step SP58 that such trigger as to stop outputting AV data has occurred, and after stopping the output of AV data, moves on to next step SP59 where the processing procedure RT10 is completed.

Figure 39:
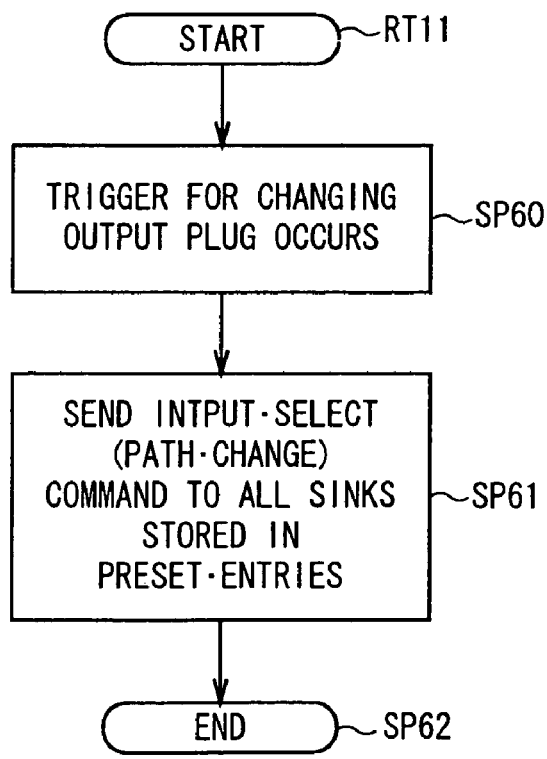
FIG. 39 is a flowchart showing a processing procedure by the source in a state where an interdevice connection should be established.
Figure 40:
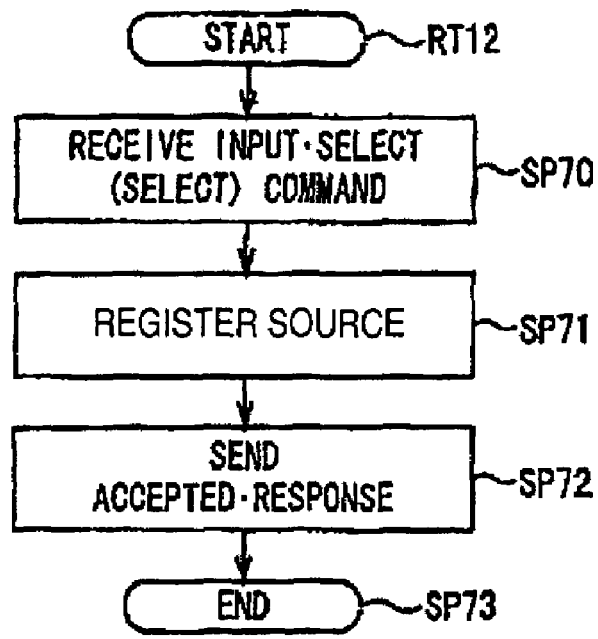
FIG. 40 is a flowchart showing a processing procedure by a sink in a state where it has not selected a source and should establish an interdevice connection.

Furthermore, when such a trigger as to change an output plug occurs, the source carries out the processing procedure RT11 shown in FIG. 39. Specifically, the source starts the processing procedure RT11 in FIG. 39, determines at step SP60 that such trigger as to change an output plug has occurred, moves on to next step SP61 whether it sends an input•select•command with PATH•CHANGE specified in the subfunction to all sinks stored in the preset•entries, and moves on to step SP62 where the processing procedure RT11 is completed.

Now, FIG. 40 to FIG. 44 show processing procedure RT12 to RT16 which are performed by the sink in a state where it has not selected a source and should establish an interdevice connection. In this case, when an input•select•command with SELECT specified in the subfunction is sent, the sink performs the processing procedure RT12 shown in FIG. 40. Specifically, the sink starts the processing procedure RT12 in FIG. 40, receives the input•selected•command the SELECT specified in the subfunction at step SP70, moves on to next step SP71 where it registers the source.

Then, the sink sends an accepted•response at step SP72, and moves on to step SP73 where the processing procedure RT12 is completed.

Figure 41:
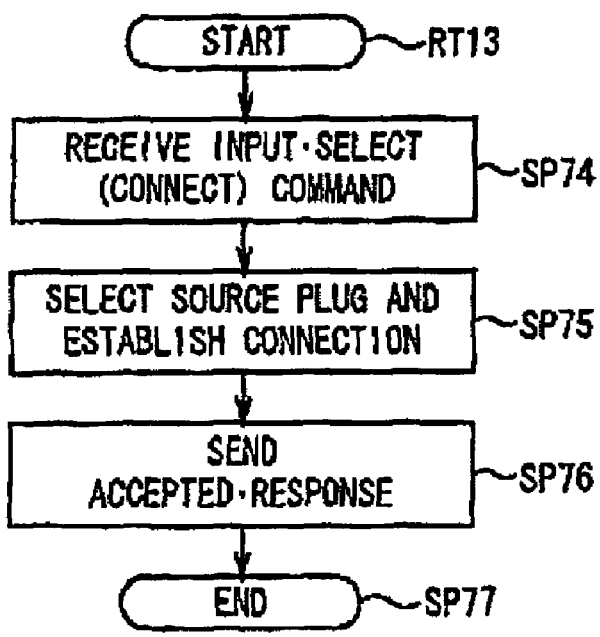
FIG. 41 is a flowchart showing a processing procedure by the sink in a state where it has not selected a source and should establish an interdevice connection.

Further, when an input•select•command with CONNECT specified in the subfunction is sent, the sink performs the processing procedure RT13 shown in FIG. 41. Specifically, the sink starts the processing procedure RT13 in FIG. 41, receives the input•select•command with CONNECT specified in the subfunction at step SP74, and moves on to next step SP75 where it selects the source plug and then establishes an interdevice connection.

Then, the sink sends an accepted•response at step SP76, and moves on to step SP77 where the processing procedure RT13 is completed.

Figure 42:
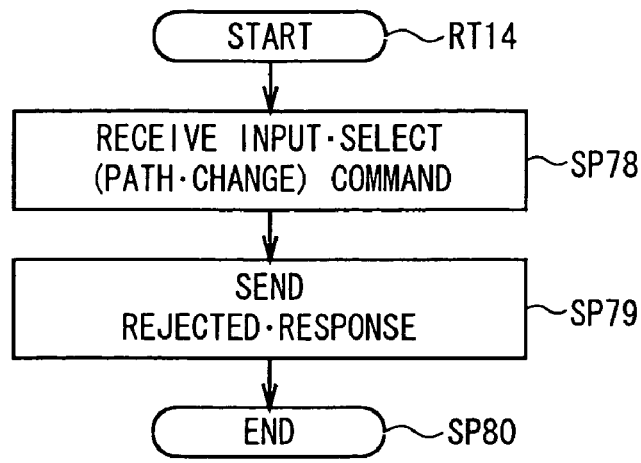
FIG. 42 is a flowchart showing a processing procedure by the sink in a state where it has not selected a source and should establish an interdevice connection.

Further, when an input•select•command with PATH•CHANGE specified in the subfunction is sent, the sink starts the processing procedure RT14 shown in FIG. 42. Specifically, the sink starts the processing procedure RT14 in FIG. 42, receives the input•select•command with PATH•CHANGE specified in the subfunction at step SP78, moves on to next step SP79 where it sends a rejected•response, and moves on to step SP80 where the processing procedure RT14 is completed.

Figure 43:
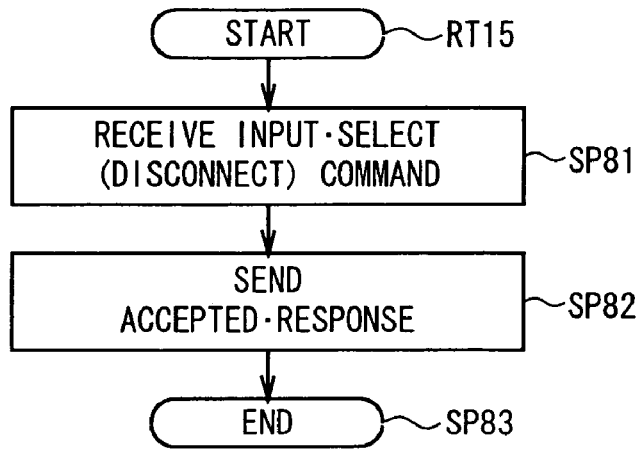
FIG. 43 is a flowchart showing a processing procedure by the sink in a state where it has not selected a source and should establish an interdevice connection.

Further, when an input•select•command with DISCONNECT specified in the subfunction is sent, the sink carries out the processing procedure RT15 shown in FIG. 43. Specifically, the sink starts the processing procedure RT15 in FIG. 43, receives the input•select•command with DISCONNECT specified in the subfunction at step SP81, moves on to next step SP82 where it sends an accepted•response, and then moves on to step SP83 where the processing procedure RT15 is completed.

Figure 44:
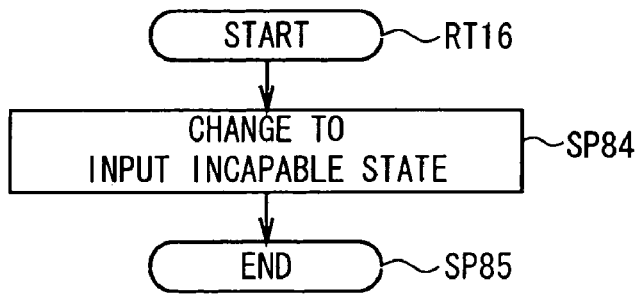
FIG. 44 is a flowchart showing a processing procedure by the sink in a state where it has not selected a source and should establish an interdevice connection.
Figure 45:
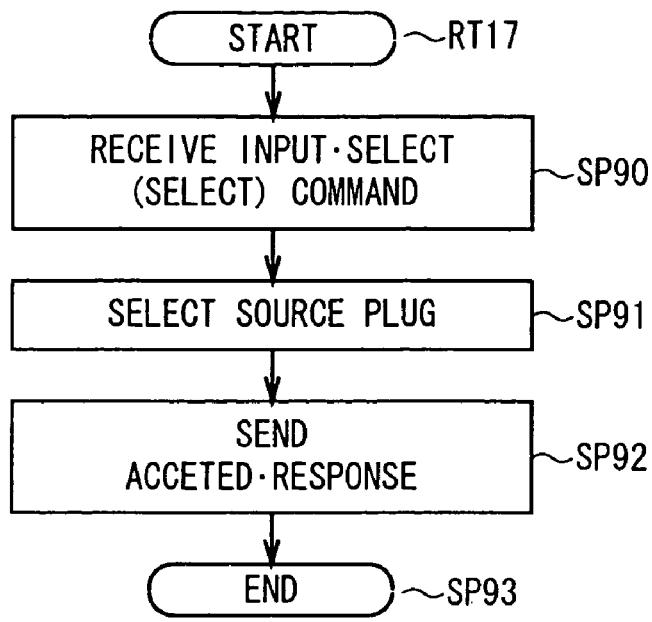
FIG. 45 is a flowchart showing a processing procedure by a sink in a state where it has not selected a source and should not establish an interdevice connection.

Further, in the case where the sink changes to an input incapable state, it carries out the processing procedure RT16 shown in FIG. 44. Specifically, the sink starts the processing procedure RT16 in FIG. 44, changes to an input incapable state at step SP84, and moves on to step SP85 where the processing procedure RT16 is completed.

Now, FIG. 45 to FIG. 49 show processing procedures RT17 to RT21 which are performed by the sink in a state where it has not selected a source and should not establish an interdevice connection. In this case, when an input•select•command with SELECT specified in the subfunction is sent, the sink carries out the processing procedure RT17 shown in FIG. 45. Specifically, the sink starts the processing procedure RT17 in FIG. 45, receives the input•select•command with SELECT specified in the subfunction at step SP90, and moves on to next step SP91 where it registers the source.

Then, the sink sends an accepted•response at step SP92 and then moves on to step SP93 where the processing procedure RT17 is completed.

Figure 46:
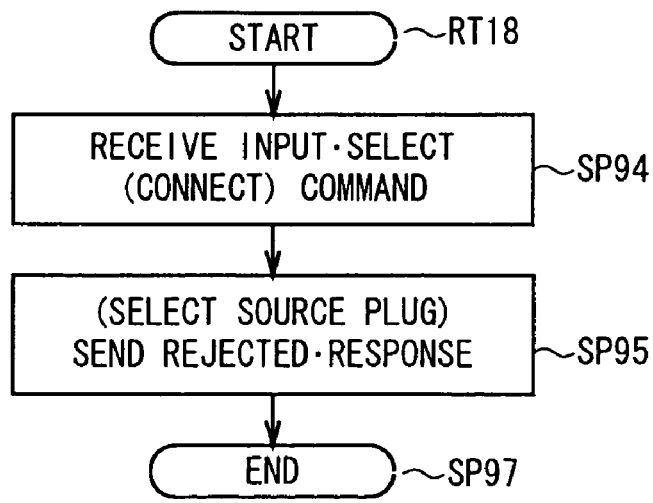
FIG. 46 is a flowchart showing a processing procedure by the sink in a state where it has not selected a source and should not establish an interdevice connection.

Further, when an input•select•command with CONNECT specified in the subfunction is sent, the sink carries out the processing procedure RT18 shown in FIG. 46. Specifically, the sink starts the processing procedure RT18 in FIG. 46, receives the input•select•command with CONNECT specified in the subfunction at step SP94, moves on to next step SP95 where it sends a rejected•response, or sends a rejected response after selecting the source plug, and moves on to step SP97 where the processing procedure RT18 is completed.

Figure 47:
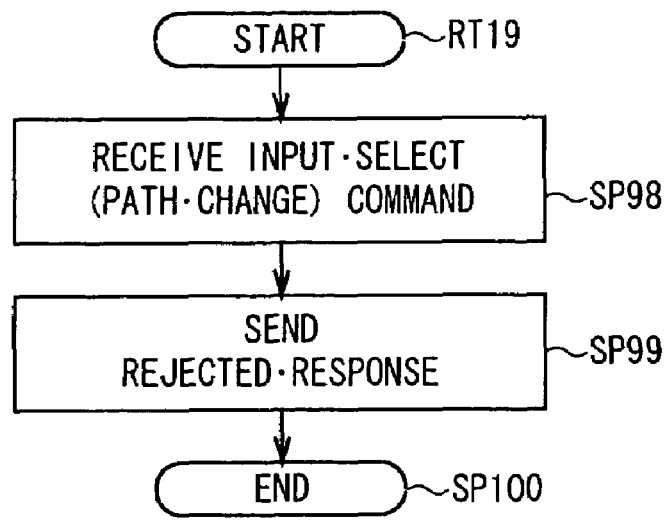
FIG. 47 is a flowchart showing a processing procedure by the sink in a state where it has not selected a source and should not establish an interdevice connection.

Further, when an input•select•command with PATH•CHANGE specified in the subfunction is sent, the sink carries out the processing procedure RT19 shown in FIG. 47. Specifically, the sink starts the processing procedure RT19 in FIG. 47, receives the input•select•command with PATH•CHANGE specified in the subfunction at step SP98, moves on to next step SP99 where it sends a rejected•response, and then moves on to step SP100 where the processing procedure RT19 is completed.

Figure 48:
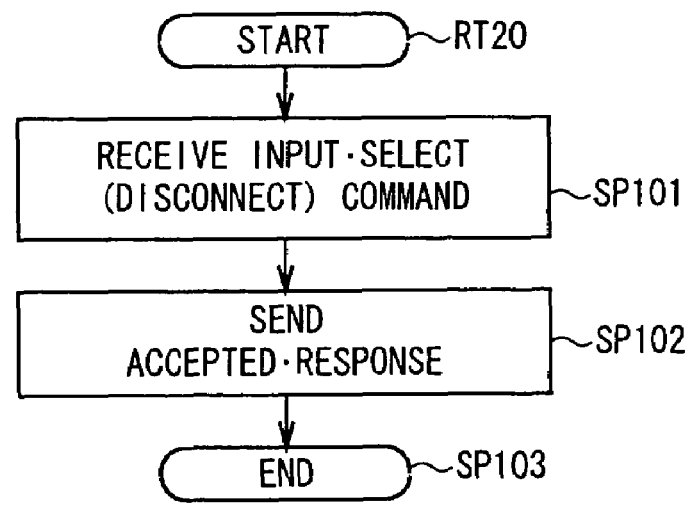
FIG. 48 is a flowchart showing a processing procedure by the sink in a state where it has not selected a source and should not establish an interdevice connection.

Further, when an input•select•command with DISCONNECT specified in the subfunction is sent, the sink carries out the processing procedure RT20 shown in FIG. 48. Specifically, the sink starts the processing procedure RT20 in FIG. 48, receives the input•select•command with DISCON- NECT specified in the subfunction at step SP101, moves on to next step SP102 where it sends an accepted•response, and moves on to step SP103 where the processing procedure RT20 is completed.

Figure 49:
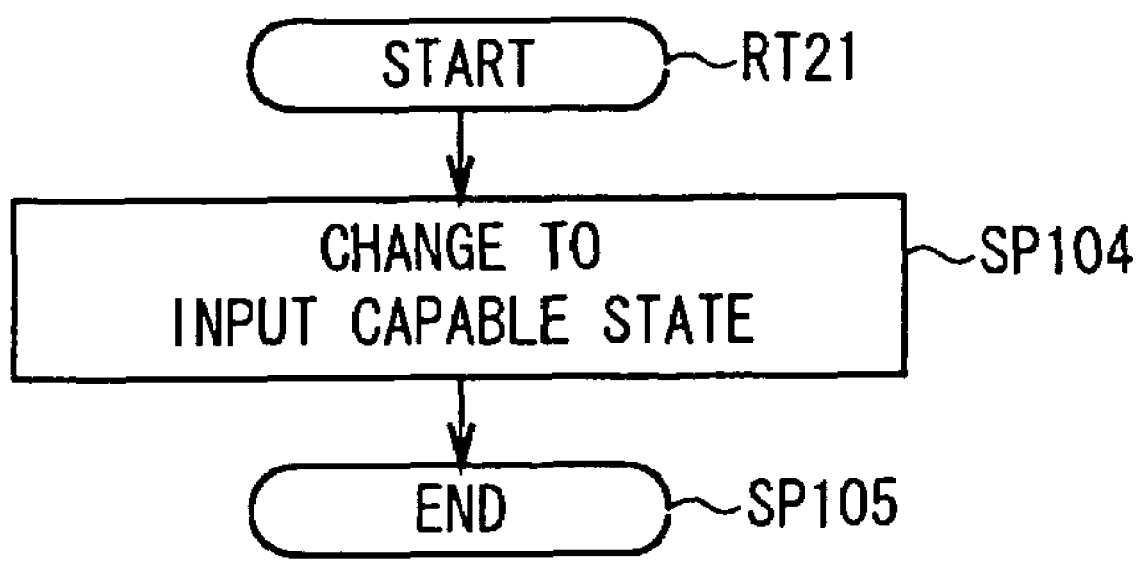
FIG. 49 is a flowchart showing a processing procedure by the sink in a state where it has not selected a source and should not establish an interdevice connection.
Figure 50:
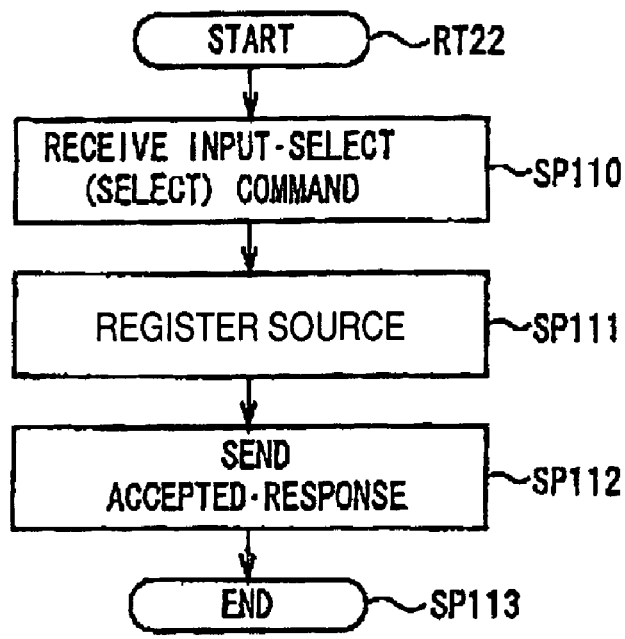
FIG. 50 is a flowchart showing a processing procedure by a sink in a state where it should establish an interdevice connection in a case where it has selected a source and has not established the interdevice connection.

Further, in the case where the sink changes to an input capable state, it performs the processing procedure RT21 shown in FIG. 49. Specifically, the sink starts the processing procedure RT21 in FIG. 49, changes to an input capable state at step SP104, and then moves on to step SP105 where the processing procedure RT21 is completed.

Now, FIG. 50 to FIG. 54 show processing procedures RT22 to RT26 which are carried out by the sink in a state which it should establish an interdevice connection in the case where it has selected a source and has not established an interdevice connection. In this case, when an input•select•command with SELECT specified in the subfunction is sent, the sink carries out the processing procedure RT22 shown in FIG. 50. Specifically, the sink starts the processing procedure RT22 in FIG. 50, receives the input•select•command with SELECT specified in the subfunction at step SP110, and moves on to next step SP111 where it registers the source.

Then, the sink sends an accepted•response at step SP112 and then moves on to step SP113 where the processing procedure RT22 is completed.

Figure 51:
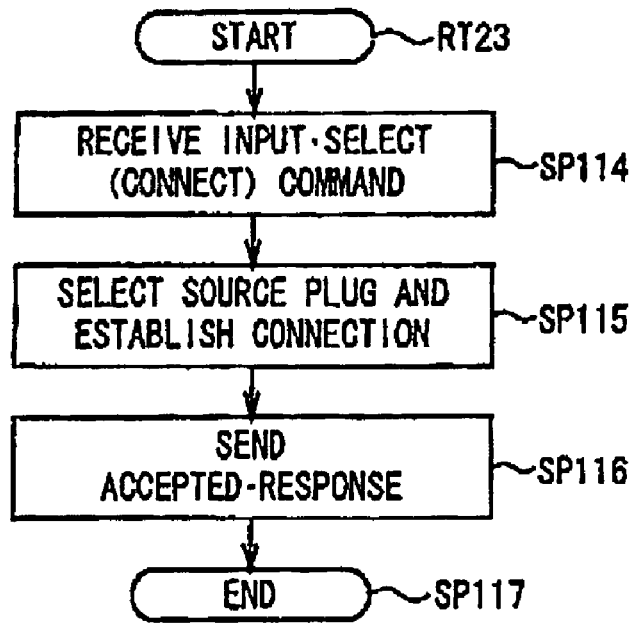
FIG. 51 is a flowchart showing a processing procedure by the sink in a state where it should establish an interdevice connection in a case where it has selected a source and has not established the interdevice connection.

Further, when an input•select•command with CONNECT specified in the subfunction is sent, the sink carries out the processing procedure RT23 shown in FIG. 51. Specifically, the sink starts the processing procedure RT23 in FIG. 51, receives the input•select•command with CONNECT specified in the subfunction at step SP114, and moves on to next step SP115 where it establishes an interdevice connection after selecting the source plug.

Then, after the sink sends an accepted•response at step SP116, it moves on to step SP117 where the processing procedure RT23 is completed.

Figure 52:
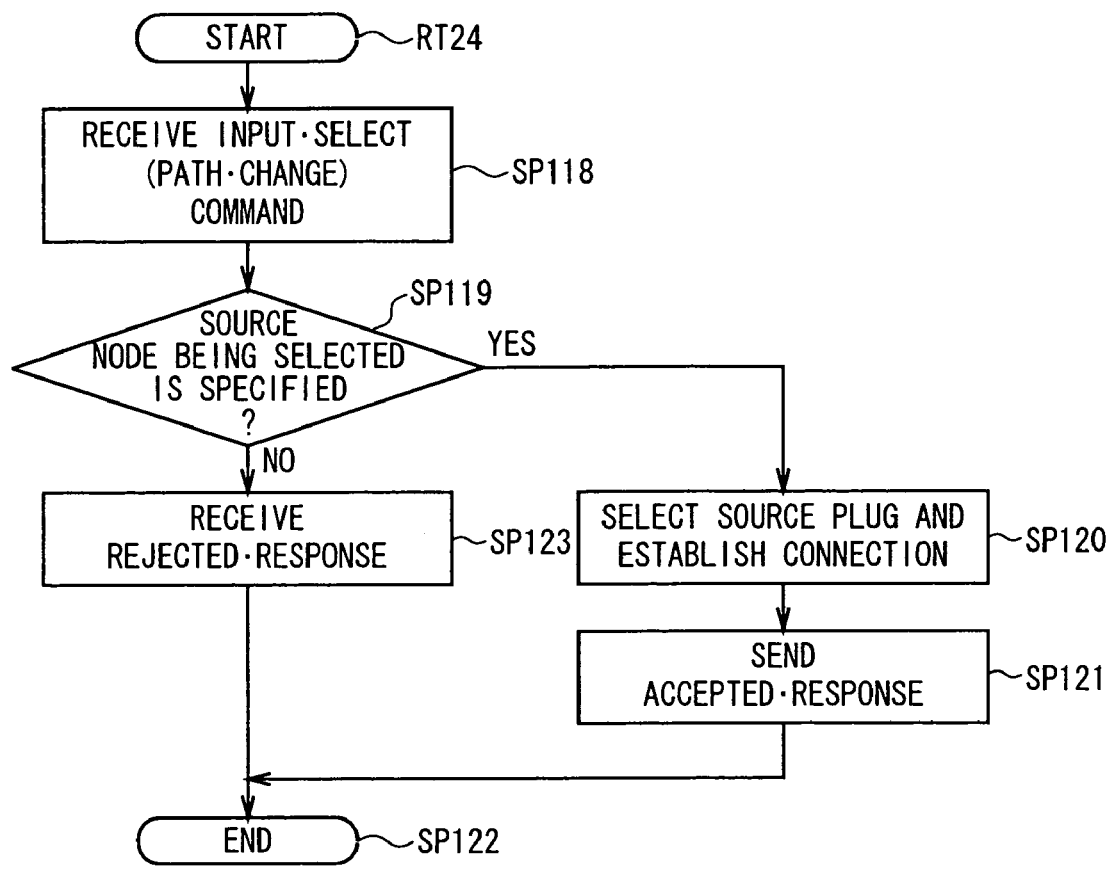
FIG. 52 is a flowchart showing a processing procedure by the sink in a state where it should establish an interdevice connection in a case where it has selected a source and has not established an interdevice connection.

Further, when an input•select•command with PATH•CHANGE specified in the subfunction is sent, the sink carries out the processing procedure RT24 shown in FIG. 52. Specifically, the sink starts the processing procedure RT24 in FIG. 52, receives the input•select•command with PATH•CHANGE specified in the subfunction at step SP118, and moves on to next step SP119 where it judges whether the input•select•command specifies the source node being selected.

An affirmative result at step SP119 means that the input•select•command specifies the source node being selected, and in this case, the sink moves on to next step SP120 where it establishes an interdevice connection after selecting the source plug.

Then, the sink sends an accepted•response at step SP121 and moves on to step SP122 where the processing procedure RT24 is completed.

A negative result at step SP119, on the contrary, means that the input•select•command does not specify the source node being selected, and in this case, the sink moves on to next step SP123 where it sends a rejected•response, and moves on to step SP122 where the processing procedure RT24 is completed.

Figure 53:
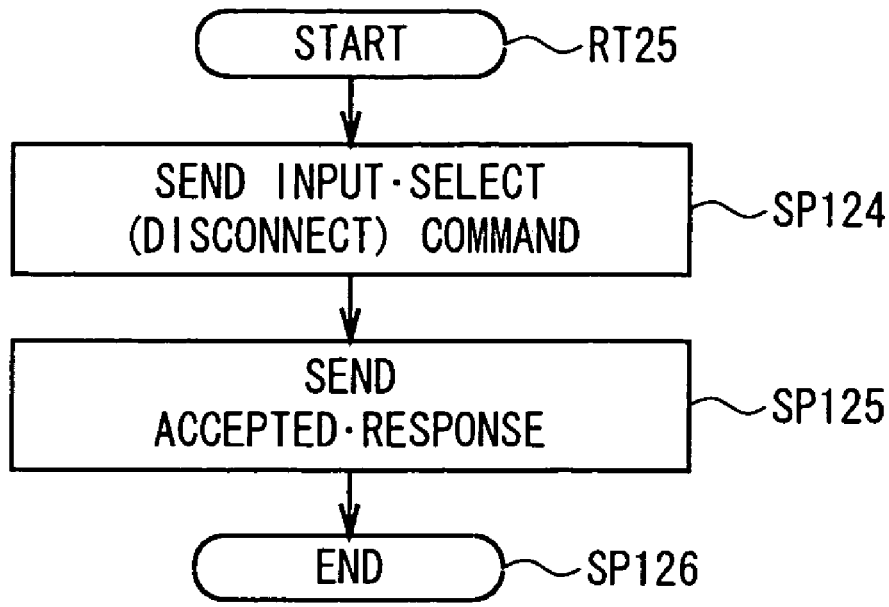
FIG. 53 is a flowchart showing a processing procedure by the sink in a state where it should establish an interdevice connection in a case where it has selected a source and has not established an interdevice connection.

Further, when an input•select•command with DISCONNECT specified in the subfunction is sent, the sink carries out the processing procedure RT25 shown in FIG. 53. The sink starts the processing procedure RT25 in FIG. 53, receives the input•select•command with DISCONNECT specified in the subfunction at step SP124, moves on to next step SP125 where it sends an accepted•response, and moves on to step SP126 where the processing procedure RT25 is completed.

Figure 54:
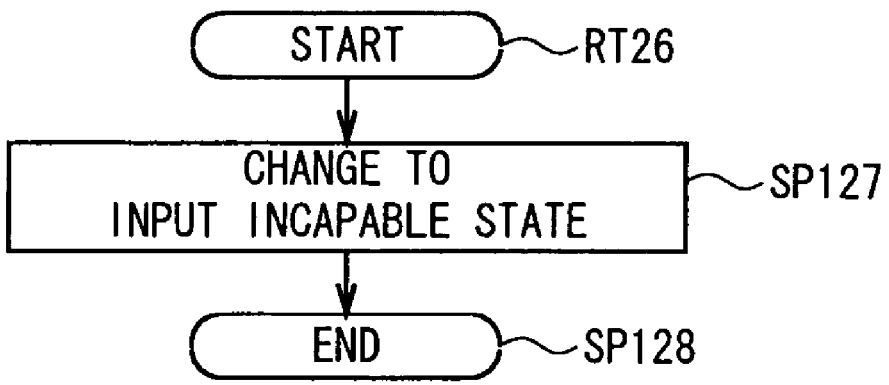
FIG. 54 is a flowchart showing a processing procedure by the sink in a state where it should establish an interdevice connection in a case where it has selected a source and has not established an interdevice connection.

Further, in the case where the sink changes to an input incapable state, it carries out the processing procedure RT26 shown in FIG. 54. Specifically, the sink starts the processing procedure RT26 in FIG. 54, changes to the input incapable state at step SP127 and then moves on to step SP128 where the processing procedure RT26 is completed.

Now, FIG. 55 to FIG. 59 show processing procedures RT27 to RT31 which are performed by the sink in a state where it should not establish an interdevice connection in the case where it has selected a source and has not established an interdevice connection. In this case, when an input•select•command with SELECT specified in the subfunction is sent, the sink carries out the processing procedure RT27 shown in FIG. 55.

Figure 55:
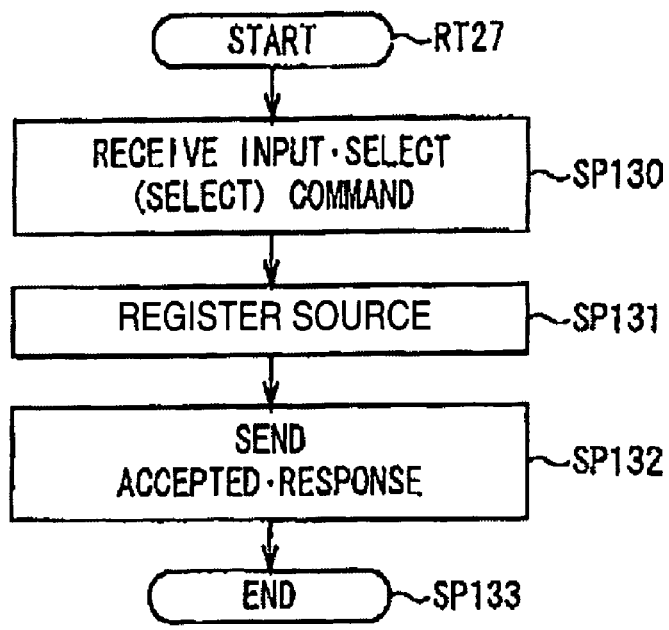
FIG. 55 is a flowchart showing a processing procedure by a sink in a state where it should not establish an interdevice connection in a case where it has selected a source and has not established the interdevice connection.

Specifically, the sink starts the processing procedure RT27 in FIG. 55, receives the input•select•command with SELECT specified in the subfunction at step SP130, and moves on to next step SP131 where it selects the source plug.

Then, the sink sends an accepted•response at step SP132, and moves on to step SP133 where the processing procedure RT27 is completed.

Figure 56:
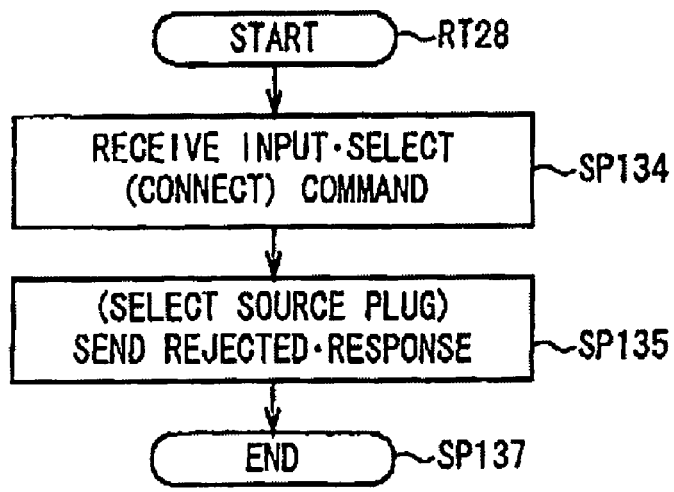
FIG. 56 is a flowchart showing a processing procedure by the sink in a state where it should not establish an interdevice connection in a case where it has selected a source and has not established the interdevice connection.

Further, when an input•select•command with CONNECT specified in the subfunction is sent, the sink carries out the processing procedure RT28 shown in FIG. 56. Specifically, the sink starts the processing procedure RT28 in FIG. 56, receives the input•select•command with CONNECT specified in the subfunction at step SP134, moves on to next step SP135 where it sends a rejected•response after selecting the source plug or sends a rejected•response, and then moves on to step SP137 where the processing procedure RT28 is completed.

Figure 57:
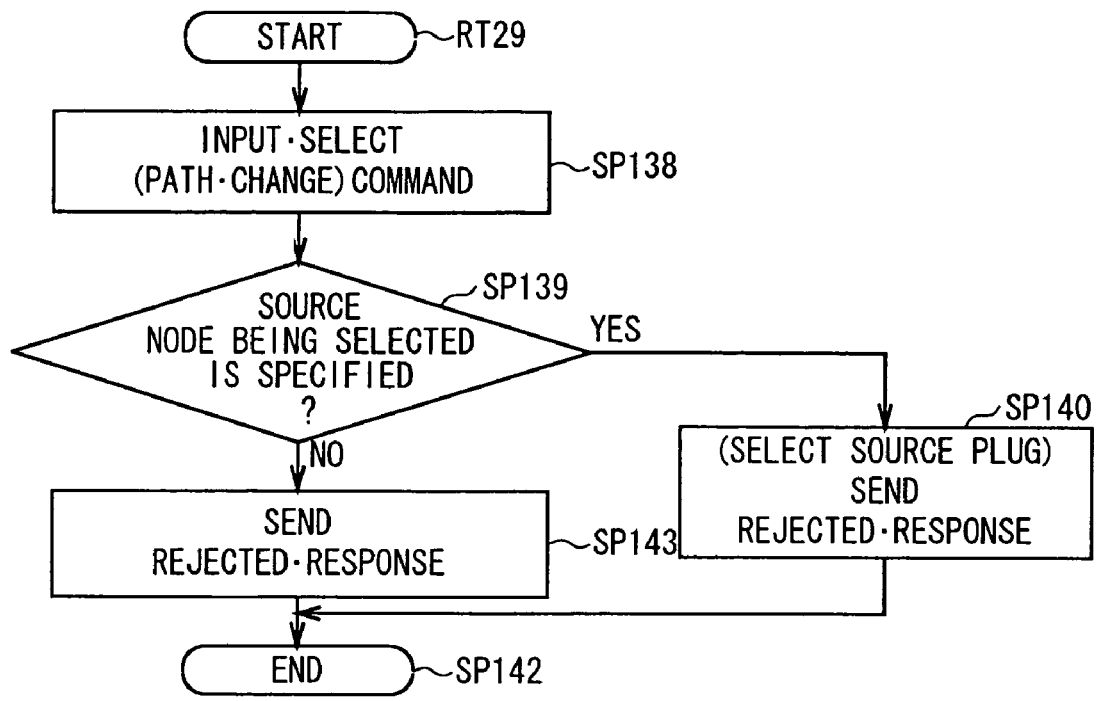
FIG. 57 is a flowchart showing a processing procedure by the sink in a state where it should not establish an interdevice connection in a case where it has selected a source and has not established the interdevice connection.

Further, when an input•select•command with PATH•CHANGE specified in the subfunction is sent, the sink performs the processing procedure RT29 shown in FIG. 57. Specifically, the sink starts the processing procedure RT29 in FIG. 57, receives the input•select•command with PATH•CHANGE specified in the subfunction at step SP138 and moves on to next step SP139 where it judges whether the input•select•command specifies the source node being selected.

An affirmative result at step SP139 means that the input•select•command specifies the source node being selected, and in this case, the TV 5 serving as the sink moves on to next step SP140 where it sends a rejected•response after selecting the source plug, or sends a rejected•response, and moves on to step SP142 where the processing procedure RT29 is completed.

A negative result at step SP139, on the contrary, means that the input•select•command does not specify the source node being selected, and in this case, the sink moves on to next step SP143 where it sends a rejected•response, and then moves on to step SP142 where the processing procedure RT29 is completed.

Figure 58:
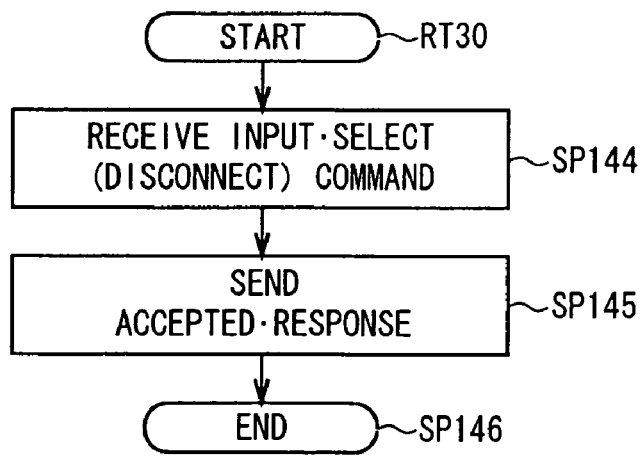
FIG. 58 is a flowchart showing a processing procedure by the sink in a state where it should not establish an interdevice connection in a case where it has selected a source and has not established the interdevice connection.

Further, when an input•select•command with DISCONNECT specified in the subfunction is sent, the sink performs the processing procedure RT30 shown in FIG. 58. Specifically, the sink starts the processing procedure RT30 in FIG. 58, receives the input•select•command with DISCONNECT specified in the subfunction at step SP144, moves on to next step SP145 where it sends an accepted•response, and moves on to step SP146 where the processing procedure RT30 is completed.

Figure 59:
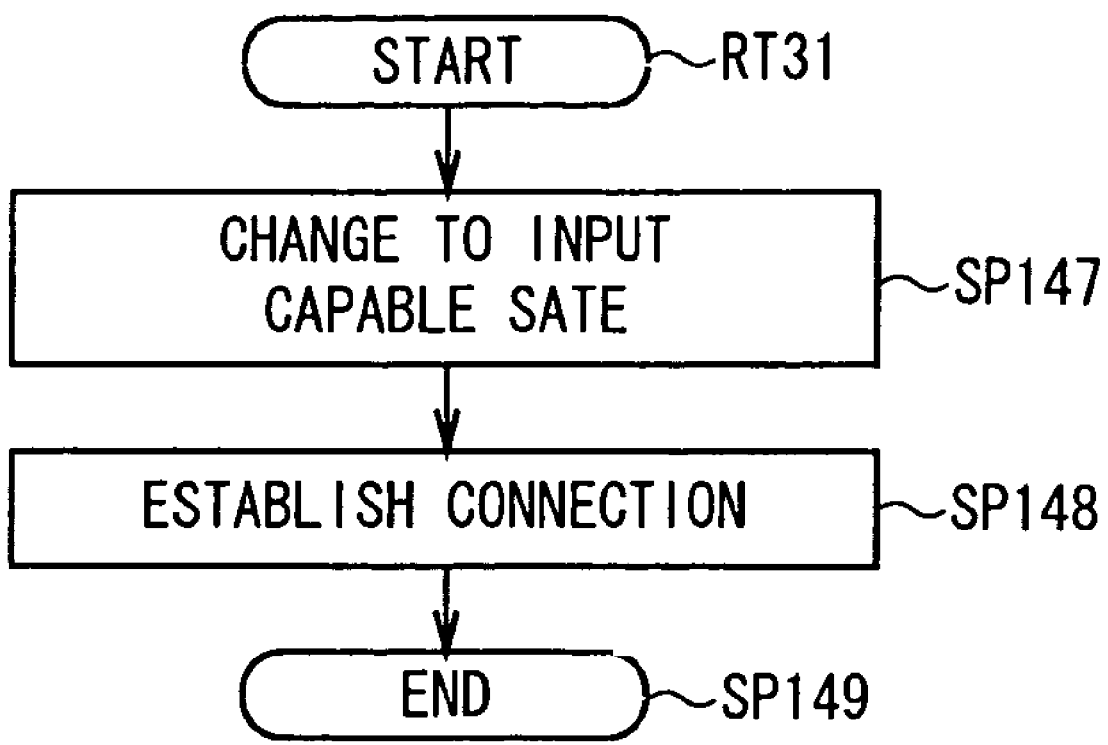
FIG. 59 is a flowchart showing a processing procedure by the sink in a state where it should not establish an interdevice connection in a case where it has selected a source and has not established the interdevice connection.

Further, in the case where the sink changes to an input capable state, it carries out the processing procedure RT31 shown in FIG. 59. Specifically, the sink starts the processing procedure RT31 in FIG. 59, changes to an input capable state at step SP147, moves on to step SP148 where it establishes an interdevice connection, and then moves on to step SP149 where the processing procedure RT31 is completed.

Now, FIG. 60 to FIG. 65 show the processing procedures which are performed by the sink in a state where it has established an interdevice connection. In this case, when an input•select•command with SELECT specified in the subfunction is sent, the sink performs the processing procedure RT41 shown in FIG. 60.

Figure 60:
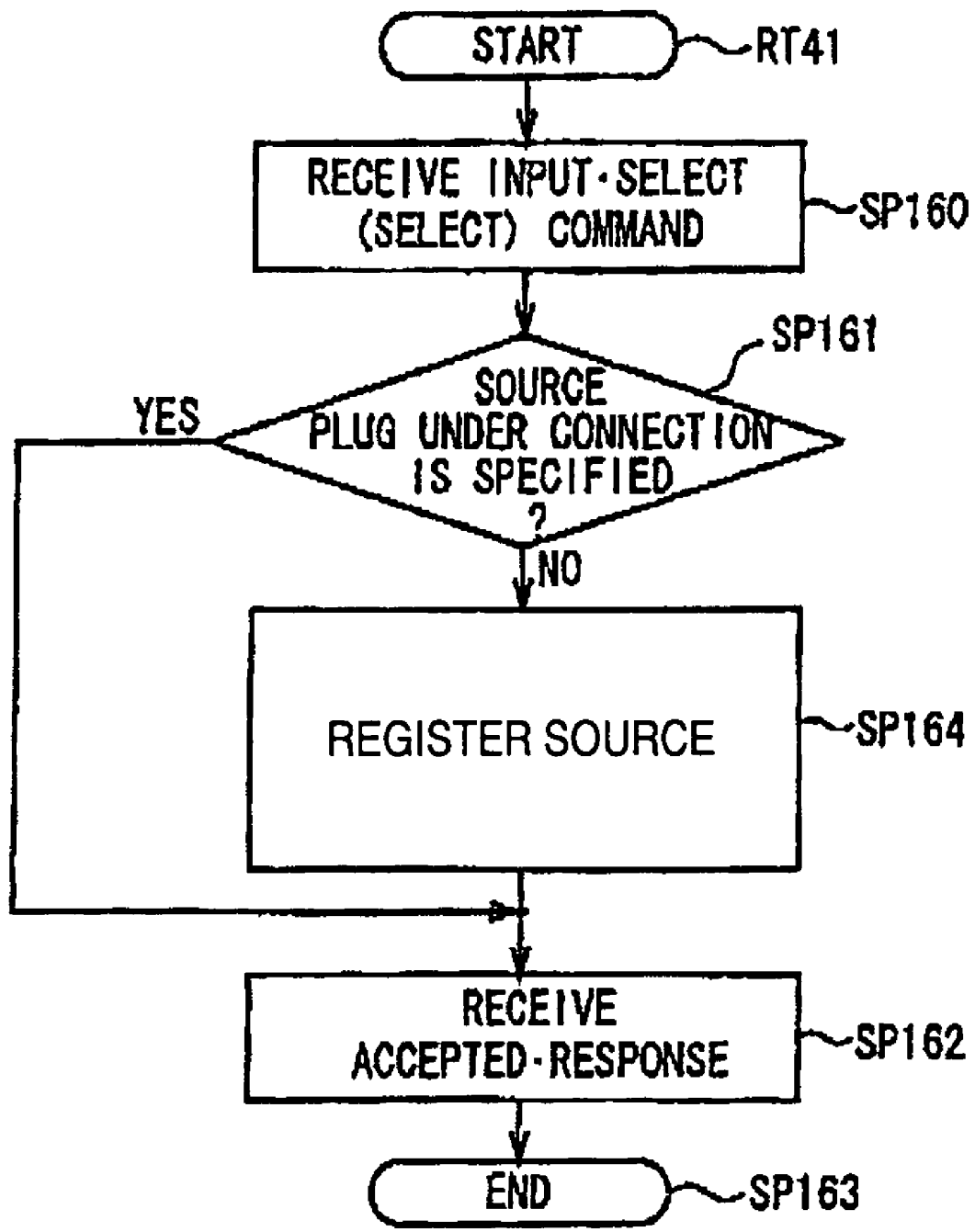
FIG. 60 is a flowchart showing a processing procedure by a sink in a state where it has established an interdevice connection.

Specifically, the sink starts the processing procedure RT41 in FIG. 60, receives the input•select•command with SELECT specified in the subfunction at step SP16O, moves on to next step SP161 where it judges whether the input select command specifies the source under connection.

An affirmative result at step SP161 means that the input•select•command specifies the source under connection, and in this case, the TV 5 serving as the sink moves on to step SP162 where it sends an accepted•response and then moves on to step SP163 where the processing procedure RT41 is completed.

A negative result at step SP161, on the contrary, means that the input•select•command does not specify the source under connection, and in this case, the sink moves on to step SP164 where it registers the source, moves on to next step SP162 where it sends an accepted•response, and moves on to step SP163 where the processing procedure is completed.

Figure 61:
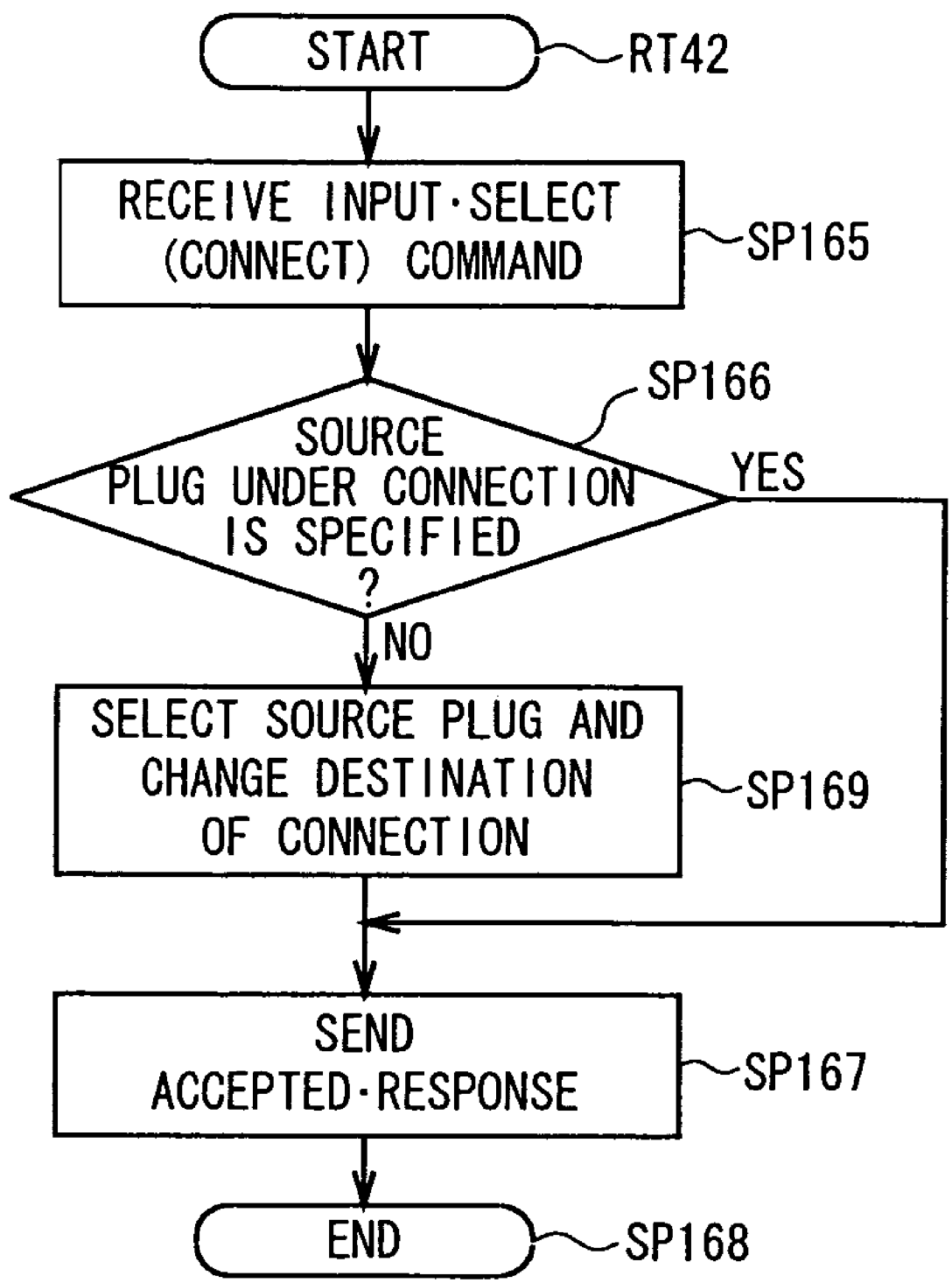
FIG. 61 is a flowchart showing a processing procedure by the sink in a state where it has established an interdevice connection.

Further, when an input•select command with CONNECT specified in the subfunction is sent, the sink carries out the processing procedure RT42 shown in FIG. 61. Specifically, the sink starts the processing procedure RT42 in FIG. 61, receives the input•select•command with CONNECT specified in the subfunction, and moves on to next step SP166 where it judges whether the input•select•command specifies the source plug under connection.

An affirmative result at step SP166 means that the input•select•command specifies the source plug under connection, and in this case, the sink moves on to next step SP167 where it sends an accepted•response, and moves on to step SP168 where the processing procedure RT42 is completed.

A negative result at step SP166, on the contrary, means that the input•select•command does not specify the source plug under connection, and in this case, the sink moves on to step SP169 where it selects the source plug and changes the destination of the interdevice connection, moves on to step SP167 where it sends an accepted•response, and then moves on to step SP168 where the processing procedure RT42 is completed.

Figure 62:
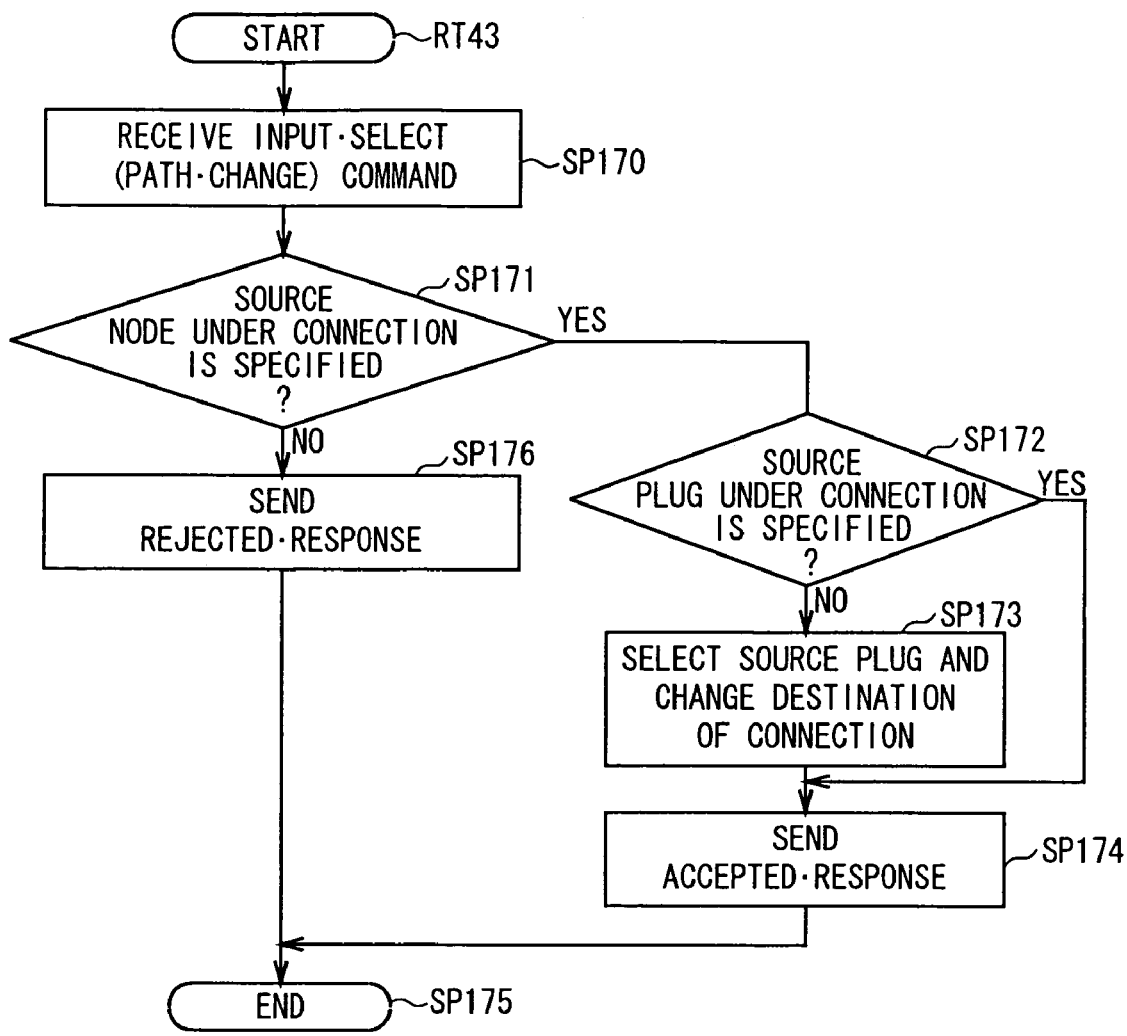
FIG. 62 is a flowchart showing a processing procedure by the sink in a state where it has established an interdevice connection.

Further, when an input•select•command with PATH•CHANGE specified in the subfunction is sent, the sink carries out the processing procedure RT43 shown in FIG. 62. Specifically, the sink starts the processing procedure RT43 in FIG. 62, receives the input•select•command with PATH•CHANGE specified in the subfunction at step SP170, moves on to next step SP171 where it judges whether the input•select•command specifies the source node under connection.

An affirmative result at step SP171 means that the input•select•command specifies the source node under connection, and in this case, the sink moves on to next step SP172 where it judges whether the input•select•command specifies the source plug under connection.

An affirmative result at step SP172 means that the input•select•command specifies the source plug under connection, and in this case, the sink moves on to step SP174 where it sends an accepted•response and moves on to step SP175 where the processing procedure RT43 is completed.

A negative result at step SP172, on the contrary, means that the input•select•command does not specify the source plug under connection, and in this case, the sink moves on to step SP173 where it selects the source plug and changes the destination of the interdevice connection, and moves on to next step SP174 where it sends an accepted•response and moves on to step SP175 where the processing procedure RT43 is completed.

By the way, a negative result at step SP171 means that the input•select•command does not specify the source node under connection, and in this case, the sink moves on to next step SP176 where it sends a rejected•response and moves on to step SP175 where the processing procedure RT43 is completed.

Figure 63:
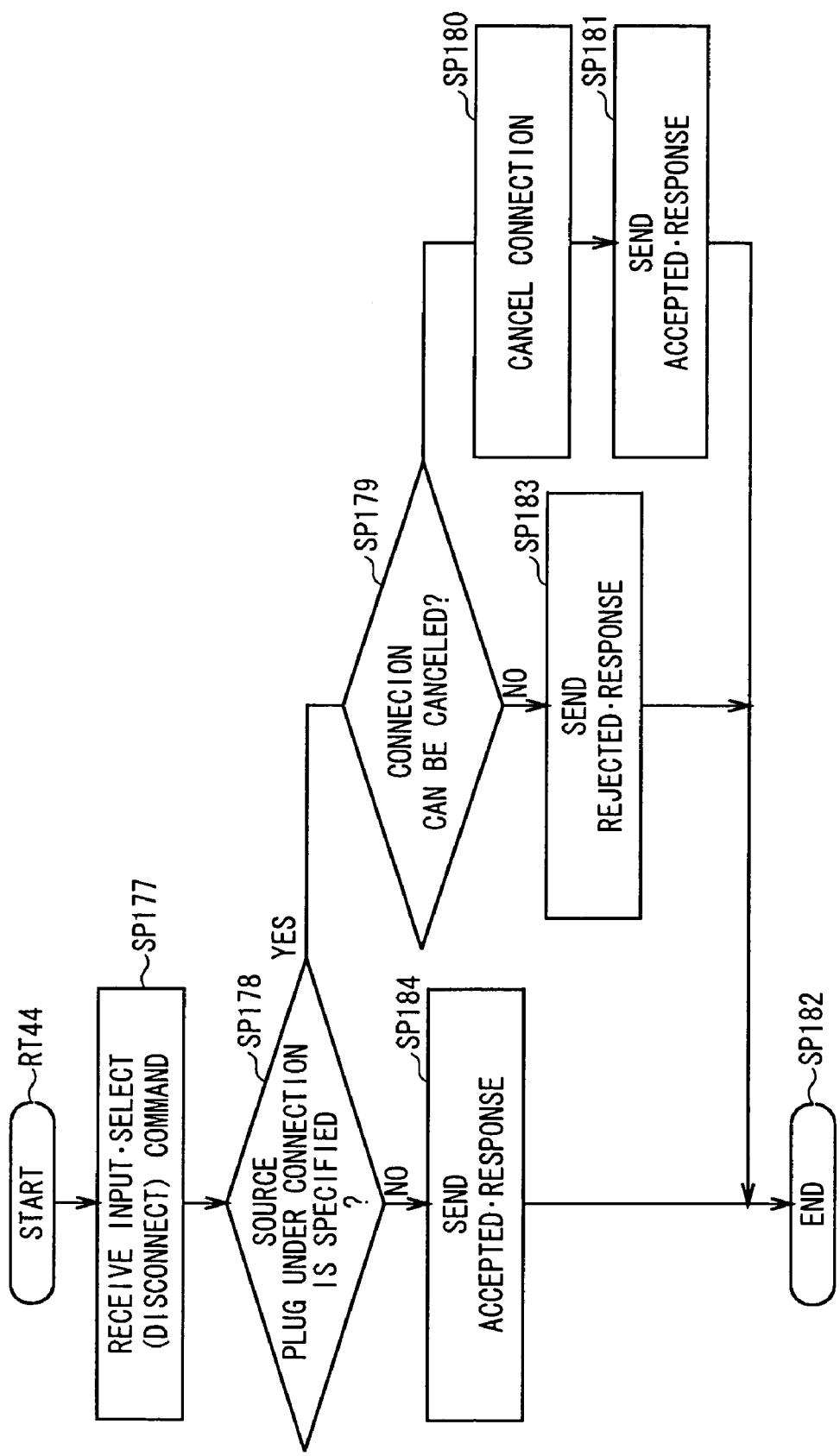
FIG. 63 is a flowchart showing a processing procedure by the sink in a state where it has established an interdevice connection.

Further, when an input•select•command with DISCONNECT specified in the subfunction is sent, the sink carries out the processing procedure RT44 shown in FIG. 63. Specifically, the sink starts the processing procedure RT44 in FIG. 63, receives the input•select•command with DISCONNECT specified in the subfunction and moves on to next step SP178 where it judges whether the input•select•command specifies the source plug under connection.

An affirmative result at step SP178 means that the input•select•command specifies the source plug under connection, and in this case, the sink moves on to step SP179 where it judges whether the sink is in a state where it can cancel the interdevice connection.

An affirmative result at step SP179 means that the interdevice connection can be cancelled, and in this case, the sink moves on to step SP180 where it cancels the interdevice connection. Then, the sink sends an accepted•response at step SP181, and moves on to step SP182 where the processing procedure RT44 is completed.

A negative result at step SP179, on the contrary, means that the interdevice connection can not be cancelled, and in this case, the TV 5 serving as the sink moves on to step SP183 where it sends a rejected•response and moves on to next step SP182 where the processing procedure RT44 is completed.

A negative result at step SP178 means that the input•select•command does not specify the source plug under connection, and in this case, the sink moves on to step SP184 where it sends an accepted•response and moves on to next step SP182 where the processing procedure RT44 is completed.

Figure 64:
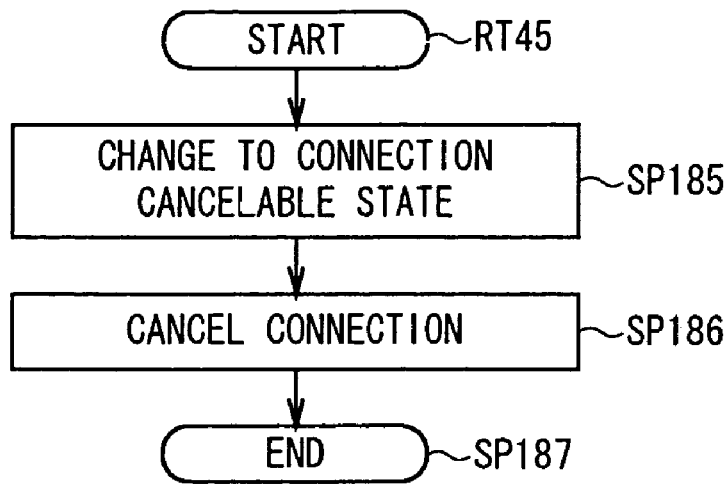
FIG. 64 is a flowchart showing a processing procedure by the sink in a state where it has established an interdevice connection.

By the way, in such a situation, like aforementioned step SP183 shown in FIG. 63, that the interdevice connection can not be canceled and a rejected•response has been sent, when the sink changes to a state where it can cancel the interdevice connection thereafter, it carries out the processing procedure RT45 shown in FIG. 64. Specifically, the sink starts the processing procedure RT45 in FIG. 64, moves on to step SP185 where it changes to a state where it can cancel the interdevice connection, then moves on to step SP186 where it cancels the interdevice connection, and moves on to next step SP187 where the processing procedure RT45 is completed.

Figure 65:
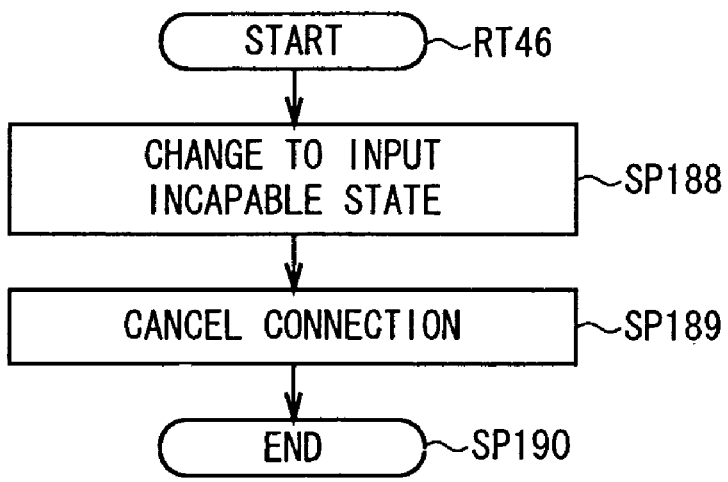
FIG. 65 is a flowchart showing a processing procedure by the sink in a state where it has established an interdevice connection.

In addition, when the sink changes to an input incapable state, it carries out the processing procedure RT46 shown in FIG. 65. Specifically, the sink starts the processing procedure RT46 in FIG. 65, changes to an input incapable state at step SP188, moves on to step SP189 where it cancels the interdevice connection, and moves on to step SP190 where the processing procedure RT46 is completed.

(6) Operation and Effects of this Embodiment

In the above system, when a sink receives an input•select•command with PATH•CHANGE specified in the subfunction•field, it judges whether the source specified in the nodeID•field of the input•select•command is registered as a source.

When it is judged that the source specified in the nodeID•field of the input•select•command is registered as a source, the sink establishes an interdevice connection with the source.

When it is judged that the source specified in the nodeID•field of the input•select•command is not registered as a source at present, on the contrary, the sink sends a rejected•response so as to avoid changing the source registration to the specified device and to avoid establishing an interdevice connection with the specified device.

Thereby, unnatural operation, which is not performed in accordance with user operation, can be prevented, and in the case where a combination of the auto-play processing, device selection processing, and path information notification processing by a source is performed, the switching operation of device selection which is naturally performed for a user can be performed.

According to the above system, when a sink receives an input•select•command with PATH•CHANGE specified in the subfunction•field, it judges whether the source specified in the nodeID•field is registered as a source, and if it is judged that the source specified is registered as a source, it establishes an interdevice connection with the source, while it avoids establishing an interdevice connection with the source if it is judged that the specified source is not registered as a source, thereby unnatural operation, which is not performed in accordance with user operation, can be prevented, and therefore the switching operation of device selection which is naturally performed for a user can be realized even if a combination of the auto-play processing, device selection processing, and path information notification processing by a source is performed.

(7) Other Embodiments

Note that, the above-mentioned embodiment has described the case where the TV 5 is set as a controller and sink. This invention, however, is not limited to this and different devices can be used for a controller and a sink.

Further, the above-mentioned embodiment has described the case where an interdevice connection is established using PCRs. This invention, however, is not limited to this and an interdevice connection can be established using external•plugs.

Still further, the above-mentioned embodiment has described the case where a PtoP connection is established using "0" channel. This invention, however, is not limited to this and a PtoP connection can be established using another kind of channel.

Still further, the above-mentioned embodiment has described the case where the network system 1 is applied as a signal processing system. This invention, however, is not limited to this and another kind of signal processing system can be applied, provided that the signal processing system is constructed by connecting a plurality of signal output devices, a signal input device and a control device to a prescribed network and a signal path is established between any signal output device out of the plurality of signal output devices and the signal input device in response to a request of the control device, and data signals outputted from the signal output device are inputted into the signal input device through the signal path.

Still further, the above-mentioned embodiment has described the case where the STB 3 and VCR 4 serving as sources are applied as signal output devices. This invention, however, is not limited to this and another kind of signal output device which outputs data signals can be applied.

Still further, the above-mentioned embodiment has described the case where the TV 5 serving as a sink is applied as a signal input device. This invention, however, is not limited to this and another kind of signal input device which inputs data signals outputted from a signal output device through a signal path can be applied.

Still further, the above-mentioned embodiment has described the case where the TV 5 serving as a controller is applied as a control device. This invention is not limited to this and another kind of control device which establishes a signal path between a signal output device and a signal input device can be applied.

Still further, the above-mentioned embodiment has described the case where the CPU 19 of the TV 5 is applied as a registration means. This invention is not limited to this and another kind of registration means for registering signal output devices can be applied.

Still further, the above-mentioned embodiment has described the case where the CPU 19 of the TV 5 is applied as an establishment means. This invention is not limited to this and another kind of establishment means can be applied, provided that, when an establishment request signal requesting the establishment of a signal path is sent from any signal output device out of a plurality of signal output devices, the establishment means judges whether the signal output device, which sent the establishment request signal, is registered in the signal input device, and establishes the signal path between the signal output device and the signal input device depending on the judged result.

According to the present invention as described above, in a signal processing system which is constructed by connecting a plurality of signal output devices, a signal input device and a control device to a prescribed network and in which a signal path is established between any signal output device out of the plurality of signal output devices and the signal input device in response to a request of the control device and data signals outputted from the signal output device are inputted into the signal input device through the signal path, the signal input device comprises a registration means for registering the signal output devices, and an establishment means for, when an establishment request signal requesting the establishment of a signal path is sent from any signal output device out of the plurality of signal output devices, judging whether the signal output device, which sent the establishment request signal, is registered in the signal input device, and establishing the signal path between the signal output device and the signal input device depending on the judged result, thereby unnatural operation, which is not performed in accordance with user operation, can be avoided, thus making it possible to realize a signal processing system which can perform the switching operation of device selection which is naturally performed for a user.

Further, in a communication control method of a signal processing system which is constructed by connecting a plurality of signal output devices, a signal input device and a control device to a prescribed network and in which a signal path is established between any signal output device out of the plurality of signal output devices and the signal input device in response to a request of the control device and data signals outputted from the signal output device are inputted into the signal input device through the signal path, the signal input device comprises a registration step of registering the signal output devices, and an establishment step of, when an establishment request signal requesting the establishment of a signal path is sent from any signal output device out of the plurality of signal output devices, judging whether the signal output device, which sent the establishment request signal, is registered in the signal input device, and establishing the signal path between the signal output device and the signal input device depending on the judged result, thereby avoiding unnatural operation, which is not performed in accordance with user operation, thus making it possible to realize a signal processing system which can perform the switching operation of device selection which is naturally performed for a user.

The invention claimed is:

1. A signal processing system, comprising:
a plurality of signal output devices;
a signal input device; and
a control device, wherein the control device:
registers a first signal path for a first signal output device;
establishes a first connection with a second signal output device;
receives, while processing data received from the second signal output device, a notification from the first signal output device to change the first signal path;
transmits a rejection response to the first signal output device; and
continues receiving the data from the second signal output device.

2. The signal processing system according to claim 1, wherein:
the first signal output device transmits an establishment request signal to the control device;
the control device determines, in response to the establishment request signal, whether the first signal output device is registered in the signal input device, wherein:
when the first signal output device is registered in the signal input device, the control device establishes a second connection between the first signal output device and the signal input device, and
when the first signal output device is not registered in the signal input device, the control device denies the second connection between the first signal output device and the signal input device.

3. The signal processing system according to claim 1, wherein:
the control device terminates the first connection;
the control device receives a second notification from the first signal output device to change the first signal path; and
the control device creates a second connection between the first signal output device and the control device based on the notification.

4. The signal processing system according to claim 1, wherein a network is constructed by a transmission path for transmitting AV/C commands.

5. The signal processing system according to claim 1, wherein a network is constructed by an IEEE1394 serial bus.

6. The signal processing system of claim 1, wherein the signal input device and the control device are different devices.

7. A signal input device, comprising:
registration means for registering one or more signal output devices; and
establishment means for, when a notification requesting chance of a first signal path is sent from a first signal output device, determining whether the first signal output device is connected with the signal input device, wherein:
when the first signal output device is connected with the signal input device, the signal input device updates the first signal path based on the notification, and
when the first signal output device is not connected with the signal input device, the signal input device transmits a rejection response to the first signal output device.

8. The signal input device according to claim 7, wherein:
the establishment means determines whether the first signal output device is registered in the signal input device, and
when the first signal output device is registered in the signal input device, the establishment means establishes a connection between the first signal output device and the signal input device, and
when the first signal output device is not registered in the signal input device, the establishment means denies the connection between the first signal output device and the signal input device.

9. The signal input device according to claim 7, wherein when the signal input device is connected to the first signal output device using a first connection, the signal input device:
terminates the first connection;
receives a second notification from the first signal output device to change the first signal path; and
creates a second connection between the first signal output device and the control device based on the notification.

10. The signal input device according to claim 7, wherein a network is constructed by a transmission path for transmitting AV/C commands.

11. The signal input device according to claim 7, wherein a network is constructed by an IEEE1394 serial bus.

12. A communication control method for a signal processing system, the method comprising:
registering, by a signal input device, a first signal path for a first signal output device;
establishing a first connection between the signal input device and a second signal output device;
receiving, by the signal input device while processing data received from the second signal output device, a notification from the first signal output device to change the first signal path;
transmitting, from the signal input device, a rejection response to the first signal output device; and
continuing to receive, by the signal input device, the data from the second signal output device.

13. The communication control method according to claim 12, further comprising determining whether the first signal output device is registered in the signal input device;
establishing, when the first signal output device is registered in the signal input device, a second connection between the first signal output device and the signal input device, and
denying, when the first signal output device is not registered in the signal input device, the second connection between the first signal output device and the signal input device.

14. The communication control method according to claim 12, further comprising:
   terminating the first connection;
   receiving a second notification from the first signal output device to change the first signal path;
   updating the first signal path based on the second notification; and
   establishing a second connection with the first signal output device using the updated first signal path.

15. The communication control method according to claim 12, wherein a network is constructed by a transmission path for transmitting AV/C commands.

16. The communication control method according to claim 12, wherein a network is constructed by an IEEE1394 serial bus.

\* \* \* \* \*

UNITED STATES PATENT AND TRADEMARK OFFICE
CERTIFICATE OF CORRECTION

| | | |
|---|---|---|
| PATENT NO. | : 7,372,821 B2 | |
| APPLICATION NO. | : 10/479675 | |
| DATED | : May 13, 2008 | |
| INVENTOR(S) | : Makoto Sato et al. | |

It is certified that error appears in the above-identified patent and that said Letters Patent is hereby corrected as shown below:

In claim 7, column 26, line 2, "chance" should read --change--

Signed and Sealed this

Nineteenth Day of May, 2009

JOHN DOLL
*Acting Director of the United States Patent and Trademark Office*